United States Patent
Garmark

(10) Patent No.: US 12,283,271 B2
(45) Date of Patent: Apr. 22, 2025

(54) VOICE FEEDBACK FOR USER INTERFACE OF MEDIA PLAYBACK DEVICE

(71) Applicant: Spotify AB, Stockholm (SE)

(72) Inventor: Sten Garmark, Stockholm (SE)

(73) Assignee: Spotify AB, Stockholm (SE)

( * ) Notice: Subject to any disclaimer, the term of this patent is extended or adjusted under 35 U.S.C. 154(b) by 789 days.

(21) Appl. No.: 17/323,585

(22) Filed: May 18, 2021

(65) Prior Publication Data

US 2021/0272569 A1    Sep. 2, 2021

Related U.S. Application Data

(63) Continuation of application No. 16/178,522, filed on Nov. 1, 2018, now Pat. No. 11,043,216.

(30) Foreign Application Priority Data

Dec. 28, 2017    (EP) .................................... 17210803

(51) Int. Cl.
| | | |
|---|---|---|
| *G10L 15/22* | (2006.01) | |
| *G06F 3/16* | (2006.01) | |
| *G11B 27/34* | (2006.01) | |

(52) U.S. Cl.
CPC .............. *G10L 15/22* (2013.01); *G06F 3/167* (2013.01); *G11B 27/34* (2013.01); *G10H 2210/066* (2013.01); *G10H 2210/076* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 7,142,645 B2 * | 11/2006 | Lowe ..................... | G06F 16/40 379/88.16 |
| 7,774,078 B2 | 8/2010 | Booth | |
| 7,973,230 B2 | 7/2011 | Mahowald | |

(Continued)

FOREIGN PATENT DOCUMENTS

WO    2011/108007 A2    9/2011

OTHER PUBLICATIONS

Extended European Search Report from European Application No. 17210803.7, mailed Jun. 27, 2018.

(Continued)

*Primary Examiner* — Richemond Dorvil
*Assistant Examiner* — Alexander G Marlow
(74) *Attorney, Agent, or Firm* — Morgan, Lewis & Bockius LLP

(57) ABSTRACT

A method of providing voice feedback to a listener as part of a user interface of a media playback system may include: storing multiple different voice feedback recordings in at least one computer-readable storage device, where each of the multiple different voice feedback recordings is of a different voice artist; receiving a listener command corresponding to a musical selection; determining an identifying musical characteristic of the musical selection; selecting a first voice feedback recording from the multiple different voice feedback recordings, where the first voice feedback recording corresponds to the identifying musical characteristic; and playing the first voice feedback recording to the listener via the media playback system.

19 Claims, 18 Drawing Sheets

(56) References Cited

U.S. PATENT DOCUMENTS

| | | | |
|---|---|---|---|
| 8,891,794 B1 | 11/2014 | Lin | |
| 9,092,435 B2* | 7/2015 | Douthitt | H04L 67/568 |
| 9,484,030 B1* | 11/2016 | Meaney | H04R 3/005 |
| 11,043,216 B2 | 6/2021 | Garmark | |
| 2002/0133349 A1 | 9/2002 | Barile | |
| 2003/0046076 A1 | 3/2003 | Hirota et al. | |
| 2009/0034750 A1* | 2/2009 | Ayoub | G10L 25/69 |
| | | | 704/E15.001 |
| 2010/0036666 A1* | 2/2010 | Ampunan | G10L 13/00 |
| | | | 707/E17.014 |
| 2010/0145706 A1 | 6/2010 | Kato | |
| 2011/0066438 A1* | 3/2011 | Lindahl | G10L 13/033 |
| | | | 704/258 |
| 2013/0318114 A1 | 11/2013 | Emerson | |
| 2014/0195252 A1* | 7/2014 | Gruber | G10L 15/22 |
| | | | 704/275 |
| 2015/0106394 A1 | 4/2015 | Otto | |
| 2015/0193196 A1 | 7/2015 | Lin | |
| 2016/0118048 A1* | 4/2016 | Heide | G10L 15/22 |
| | | | 704/275 |
| 2016/0336003 A1 | 11/2016 | Agiomyrgiannakis et al. | |
| 2018/0336894 A1* | 11/2018 | Graham | G06F 16/635 |
| 2018/0336904 A1* | 11/2018 | Piercy | G10L 17/22 |

OTHER PUBLICATIONS

European Communication pursuant to Article 94(3) EPC in Application 17210803.7, mailed Sep. 6, 2019, 6 pages.

\* cited by examiner

VOICE FEEDBACK FOR USER INTERFACE OF MEDIA PLAYBACK DEVICE

CROSS REFERENCE TO RELATED APPLICATIONS

This application is a Continuation of U.S. patent application Ser. No. 16/178,522, filed Nov. 1, 2018, which is hereby incorporated by reference in its entirety. To the extent appropriate, a claim of priority is made to the above-disclosed application.

TECHNICAL FIELD

The present application relates to media playback technology. More specifically, the application relates to voice feedback for a user interface of a media playback device.

BACKGROUND

Many people enjoy consuming media content while travelling or during other activities. The media content can include audio content, video content, or other types of media content. Examples of audio content include songs, albums, podcasts, audiobooks, etc. Examples of video content include movies, music videos, television episodes, etc. Using a mobile phone or other media-playback device, such as a vehicle-integrated media playback device, a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select desired media content or media content that complements a particular moment while travelling.

In this environment, it may often be beneficial and effective to provide a voice user interface for a listener. Typical voice feedback on music players and the like is provided by a computerized voice, such as Siri. This type of voice interface is not customized for the listener and may detract from the listening experience.

SUMMARY

In general terms, this disclosure is directed to voice feedback for a user interface of a media playback device. In one possible configuration and by non-limiting example, a media-playback device generates a user interface including voice feedback that is specifically configured to enhance selection and playback of media content items. Various aspects are described in this disclosure, which include, but are not limited to, the following aspects.

In one aspect of the disclosure, a method of providing voice feedback to a listener as part of a user interface of a media playback system may involve: storing multiple different voice feedback recordings in at least one computer-readable storage device, wherein each of the multiple different voice feedback recordings is of a different voice artist; receiving, with the media playback system, a listener command corresponding to a musical selection; determining, with a processing device of the media playback system, an identifying musical characteristic of the musical selection; selecting a first voice feedback recording from the multiple different voice feedback recordings, using the processing device, wherein the first voice feedback recording corresponds to the identifying musical characteristic; and playing the first voice feedback recording to the listener via the media playback system.

In some embodiments, each of the multiple different voice feedback recordings of the different voice artists corresponds to a different style of music, and the identifying musical characteristic comprises a particular style of music selected from a predefined list of different styles of music. Optionally, the method may further involve, before the storing step: receiving a first voice recording from a first voice artist; and generating a first set of multiple voice recordings from the first voice recording, using artificial intelligence. In some embodiments, the method may also include: receiving a second voice recording from a first voice artist; and generating a second set of multiple voice recordings from the second voice recording, using artificial intelligence. In some embodiments, the steps of receiving a voice recording and generating a set of multiple voice recordings may be repeated as many times as desired, for as many voice artists as desired. According to some embodiments, the first set of multiple recordings may include different tempos, different words, different pitches and/or different speaking styles of recordings of the first voice artist. The method may also optionally involve receiving a second voice recording from the first voice artist and generating a second set of multiple voice recordings from the second voice recording, using artificial intelligence.

In various embodiments, the musical selection may be a piece of music, an album, an artist, a style of music, a playlist, a shelf of music, a card of music and/or the like. According to some embodiments, different tempo recordings for each voice artist may be stored. In such embodiments, playing the first voice feedback recording may involve playing a selected tempo recording of the different recordings, based on a tempo of the musical selection, and the first voice feedback recording may be played on a beat of the musical selection by the media playback system. Examples of different tempo recordings may include a slow tempo recording, a medium tempo recording and a fast tempo recording.

In some embodiments, receiving the listener command may involve receiving at least one of a shelf selection or a card selection. For example, the request may include a shelf selection and a card selection. In some embodiments, input may be received from the listener via a joystick or a joypad mounted in a car. In some embodiments, the first voice feedback recording is played on-beat with the musical selection. In such embodiments, the method may further include creating a voice beat grid for the first voice feedback recording and creating a music beat grid for the musical selection.

In some embodiments, the first voice feedback recording may be played at least partially before the musical selection is played by the media playback system. The first voice feedback recording may alternatively or additionally be played at the same time as a beginning portion of the musical selection is played. In some embodiments, at least a portion of the first voice feedback recording is played on-beat with the musical selection. In some embodiments, the first voice feedback recording is played at least partially after the musical selection is played by the media playback system. In some embodiments, the multiple voice recordings include multiple introductions of multiple possible musical selections. Some embodiments may further include customizing at least the first voice feedback recording to address the listener by name.

In another aspect of the disclosure, a method of providing voice feedback to a listener as part of a user interface of a media playback system may involve: receiving, with the media playback system, a listener command corresponding to a musical selection; determining, with a processing device of the media playback system, at least one of a music identifying characteristic corresponding to the musical selection or a listener identifying characteristic corresponding to the listener; selecting, using the processing device, a first voice feedback recording from a collection of multiple different voice feedback recordings from different voice artists, based on at least one of the music identifying characteristic or listener identifying characteristic; and playing the first voice feedback recording to the listener via the media playback system.

Examples of the listener identifying characteristic include, but are not limited to, a geographical location, a cultural trait identified by the listener, a language spoken by the listener, a dialect spoken by the listener, a favorite type of music identified by the listener and one or more predefined identifying characteristics provided by the listener to the media playback system. In some embodiments, each of the multiple different voice feedback recordings from the different voice artists corresponds to a different style of music, and wherein the music identifying characteristic comprises a particular style of music selected from a predefined list of different styles of music. Examples of musical selections include, but are not limited to, a piece of music, an album, an artist, a style of music, a playlist, a shelf of music and a card of music.

These and other aspects and embodiments are described in greater detailed below, in reference to the attached drawing figures.

DETAILED DESCRIPTION

Figure 1:
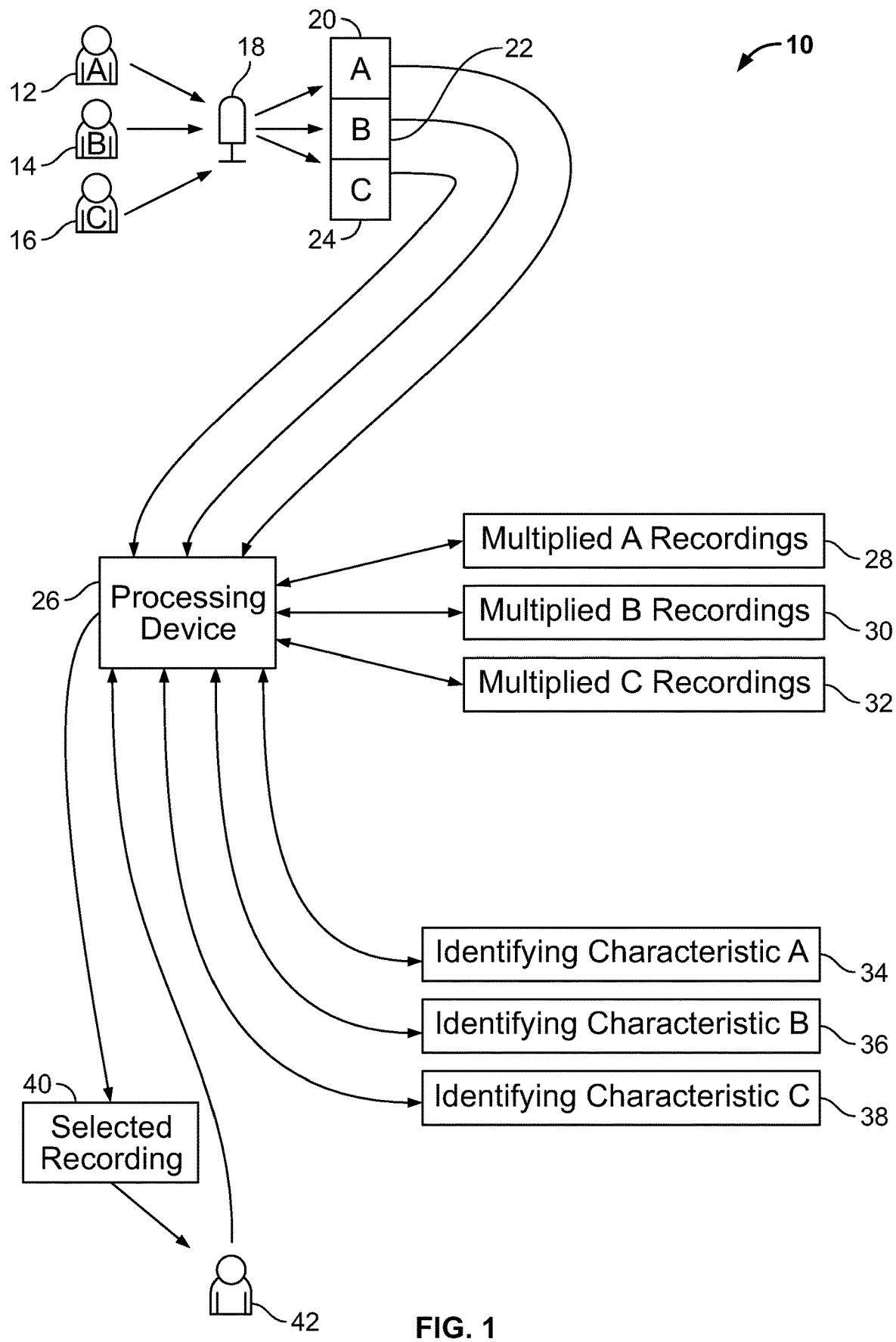
FIG. 1 is a diagram illustrating information flow in a media-playback system including a customized voice interface.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure is generally directed to a system and method for providing voice feedback for a user interface of a media-playback system. Unlike currently available computer-simulated voice interfaces, the voice feedback described herein is created by actual voice artists recording their voices and/or by enhancing or creating voice feedback from recordings of voice artists. Although much of the following description is directed to embodiments and examples of systems and methods used during travel in a car, this disclosure is not limited to travel-related embodiments and features. For example, in some embodiments, the voice feedback described herein may be used in a home, with the listener hearing the voice feedback over a home sound system, stereo, computer, tablet device, smart phone or the like. Therefore, the following descriptions of use of the systems and methods during travel should not be interpreted as limiting the scope of the disclosure.

Users of media-playback devices often consume media content during various activities, including travelling. As used herein, the term "travel" and variants thereof refers to any activity in which a user is in transit between two locations. For example, a user is in transit when being conveyed by a vehicle, including motorized and non-motorized, public transit and private vehicles. A user is also in transit when moving between locations by other means such as walking and running.

Enjoying media content while travelling presents many challenges. First, it can be difficult to safely interact with a media-playback device while travelling in a manner that does not interfere with travel related activities (driving, navigating, etc.) Second, desired media content may not be available or accessible in a format that can be accessed while travelling. Third, accessing media content while travelling may be difficult, expensive, or impossible depending on network availability/capacity along the route of travel. Fourth, accessing and playing back media content can require significant amounts of energy, potentially draining a battery in the media-playback device. Fifth, it can be challenging to connect a media-playback device to a vehicle-embedded audio system for playback while travelling in a vehicle. Embodiments disclosed herein address some or all of these challenges. Aspects described herein, however, are not limited to use during travel.

For example, in some embodiments, the media-playback device includes a limited-attention interface that requires less attention from the user and/or is less distracting than a standard interface. This limited-attention interface can be useful during travelling, because a user may have limited attention available for interacting with a media-playback device, due to the need to concentrate on travel related activities, including for example driving and navigating. But the limited-attention interface can also be configured for use playing back media content during other activities that require the user's concentration, such as exercising, playing games, operating heavy equipment, reading, studying, etc.

Consuming media content may include listening to audio content, watching video content, and/or consuming other types of media content. For ease of explanation, the embodiments described in this application are presented using specific examples. For example, audio content (and in particular music) is described as an example of one form of media consumption. As another example, travelling (and in particular driving) is described as one example of an activity during which media content is consumed. The same concepts, however, are similarly applicable to other forms of media consumption and to other activities, and at least some embodiments include other forms of media consumption and/or are configured for use during other activities.

FIG. 1 is a diagrammatic illustration of information flow in a system 10 for providing voice feedback as part of a user interface of a media-playback system. In one embodiment, any number of voice artists 12, 14, 16 may have their voices recorded 18, to create separate sets of initial voice artist recordings 20, 22, 24. Typically, the voice artists 12, 14, 16 will make initial recordings 20, 22, 24 that are similar to what disc jockeys (DJs) might say, in that they will be announcing songs, albums, playlists, music styles, artists, shelves of music, cards of music and/or the like. This list is in no way exhaustive, however, and some voice artists 12, 14, 16 may introduce audio books, news channels or reports, sporting events or the like. This disclosure will typically focus on an embodiment in which the media content being consumed is music, and the voice artists 12, 14, 16 are announcing and/or discussing music, but this is only one exemplary embodiment.

Each voice artist 12, 14, 16 may be selected to represent a different style or genre of music, and any number of artists 12, 14, 16 may be recorded. For example, just some of the musical styles for which a voice artist may be recorded are classical, opera, electronic, folk, blues, country, hip hop, jazz, pop, reggae, rap, R&B, rock (alternative, classic, heavy metal, punk), progressive, and psychedelic. The voice artists may be anyone—for example, they may be singers, famous DJs, actors, sports figures, other celebrities, or the like. In general, each voice artist 12, 14, 16 might be selected due to his or her association with a particular style or genre of music and/or with a particular geography, culture or other characteristic, so that when that artist's voice is paired with a particular style of music for playback, the user understands the correlation between the artist 12, 14, 16 and the music. For example, Snoop Dogg might be selected as an artist for introducing rap music, Jack White might be selected as an artist for introducing alternative rock music, and Ziggy Marley might be selected as an artist for reggae. In general, however, there is no limit as to who the artists 12, 14, 16 may be or how many artists may be recorded 18.

To generate the initial recordings 20, 22, 24, each voice artist 12, 14, 16 may be asked to record 18 a given number of statements, questions and/or phrases of dialogue. For example, one voice artist 12, 14, 16 may be asked to record 100 sentences of dialogue. This dialogue may encompass any topic, but in one example it may include a number of different introductions of songs, albums, playlists and the like, as well as questions, such as, "Would you like to listen to the whole album?" Similar to the selection of artists 12, 14, 16, there is no limit to the content and quantity of what is initially recorded 18 to create the initial recordings 20, 22, 24.

In one embodiment, once a set of initial voice recordings 20 of a given artist 12 is recorded, those initial recordings 20 may be processed by a processing device 26, using machine learning or natural language generation ("NLG"), to create multiplied sets of voice recordings 28, 30, 32 (or "voice tracks") of the voice artist 12. Using Ziggy Marley as an example again, if Mr. Marley's voice is to be used as a "virtual DJ" for all reggae music on a media-playback system, this may require Mr. Marley's voice to potentially say many different things—e.g., introduce hundreds of different songs, albums, playlists, and the like. Rather than ask Mr. Marley to personally record thousands of statements, NLG may be used to expand a set of initial recordings 20, for example 100 statements, into a set of multiplied recordings 28, for example 10,000 statements. This process may be similar to those used to create voice cues in other voice feedback systems, but in this system 10, the voices used are of different, live voice artists 12, 14, 16. Once all the multiplied sets of recordings 28, 30, 32 are created, they may be stored in the system, in the cloud or in any other suitable storage location.

The process used to generate the sets of recordings 28, 30, 32 from the initial recordings 20 by the artist can be performed in a variety of ways. For example, there may be a transcribed list of the initial recordings 20 that have been transcribed by a speech-to-text processor. These transcriptions can be used as the basis for generating words and/or phrases for use in the generated sets of recordings 28, 30, 32. In turn, those transcribed words and/or phrases are linked with some glue text stored separately. Additional stages of planning and merging of information can be included to enable the generation of speech that seems natural and does not become repetitive.

In some embodiments, what information to mention is first determined. Next, the overall organization of the information to convey is determined. To the extent they exist, similar sentences can be merged to improve readability and naturalness. Next, lexical choice is performed to put the words/phrases into concepts. If necessary, so-called "referring expressions" can also be created to identify objects, regions, pronouns and other types of anaphora. Lastly, the actual phrases and sentences are generated according to the rules of syntax, morphology, and orthography. In an example embodiment, an artificial intelligence is trained on a dataset of, for example, books to find words that compose together a phrase and/or phrases that compose together longer phrases and/or sentences that can be used as variations of the initial recordings 20. In some examples, the dataset can be curated to focus on works related to the speaker or the subject that will be spoken about. For example, the dataset can be curated to include interviews by the speaker, so the artificial intelligence is trained on language used by the speaker and can therefore seem more authentic. The artificial intelligence used to generate the speech can be, for example, an NLG, such as a Markov text generator trained using the dataset.

In some examples, phrases, sentences, or templates (e.g., "The next track is: <NEXT_TRACK>") may be pre-generated, such as by a human author. And an artificial intelligence can be trained to select from among the pre-generated content based on a context in which the content is to be provided. In some examples, the training data may be obtained from human DJs, emcees, or presenters.

The artificial intelligence for selecting or generating content may be a neural network, a deep learning framework, a regression framework, other kinds of artificial intelligence frameworks or combinations thereof. The artificial intelligence may be implemented using machine learning software, including but not limited to: TENSORFLOW by GOOGLE INC. of Mountain View, Calif.; OPENAI GYM by OPENAI of San Francisco, Calif.; or MICROSOFT AZURE MACHINE LEARNING by MICROSOFT CORP. of Redmond, Wash.

Using the artificial intelligence can generally involve acquiring training examples, building an artificial intelligence model using the training examples, and then applying input data to the trained model to obtain an output. In some embodiments, acquiring training examples includes acquiring files or the locations of files containing training examples. In an example, the training examples include signals, such as music characteristic related to a currently playing, recently played, or to-be-played song or environmental factors (e.g., time data, location data, traffic data, weather data, etc.), among others. The training data can also include an associated output content or description. The training data can be obtained or generated from a variety of sources. For example, one piece of training data may be based on a scenario where, during a transition from Led Zeppelin's "Communication Breakdown" to Led Zeppelin's "Dazed and Confused", a DJ said "Now let's slow it down". The training data may represent this scenario in a variety of ways. For example, the scenario may be represented as a data structure indicating an association between a comment on speed and a transition from a high beats-per-minute song to a low beats-per-minute song.

Next, one or more models are built using the training samples. In various embodiments, the one or more models are built using one or more machine learning techniques, such as through the use of neural networks. In some examples, the one or more models may operate to determine how similar or dissimilar given input data is to particular training examples for particular states. Once generated, the one or more models may be stored in a memory device for later use.

Next, input data can be applied to generate an output to predict a device state. The input data is run through one or more models to produce one or more predictions or output. The one or more predictions can have a respective score expressing a confidence in the prediction being correct, such as a value expressing how similar the input data is to particular training examples. Continuing the previous example, the input data may be that the user is listening to a high beats per minute song and a low beats per minute song is next in a playback queue. The scenario may be converted into a representation for processing by the framework (e.g., an array having one-hot encoding). In some examples the output may be text of an output content to be spoken (e.g. "let's slow it down") or may be indication of a kind of content to be spoken (e.g., an instruction to choose a comment from a list of high-to-low beats-per-minute comments)

These techniques may be applied to other situations. Other machine learning or artificial intelligence techniques may be used.

At any time, a listener 42 using the system 10 may initiate a listener command, for example requesting that the system 10 play a particular music playlist. When this occurs, processing device 26 may be used to identify one or more characteristics (or "signals"), which allow voice recordings to be played back according to the context indicated by the signals. For example, characteristics or signals may be of two general types: (1) a music characteristic related to the music that the listener requested to hear and/or (2) a listener characteristic related to the listener himself/herself. The music characteristic or signal may include, for example, the title of a piece of music, a track identifier, a title of an album, a type or style of music, the tempo of the music, the pitch of the music, the artist performing the music, the year the music was recorded or the like. The listener characteristic may include, for example, the geographic location of the listener, the listener's home town, the listener's cultural or ethnic background, any predefined characteristics that the listener might have entered into the system 10, such as the listener's favorite style of music, whether the listener is in a car that is moving, the amount of lighting present in the listener's environment or the like.

When the listener 42 requests a particular piece of music to be played, the processing device 26 may then be programmed to match the one or more identified music and/or listener characteristics or signals 34, 36, 38 with one of the sets of multiplied voice recordings 28, 30, 32. In other words, the processing device 26 pairs the recordings of one voice artist 12, 14, 16 with the music requested by the listener 42, using the identified characteristics. The processing device 26 may also use signals 34, 36, 38 as input to a trained neural net to generate relevant phrases and/or sentences. By "piece of music," it is meant any type of selection by the listener, such as a selection of a song, an album, a playlist, a shelf, a card or the like. After the processing device 26 pairs one of the multiplied sets of voice recordings 28, 30, 32 with the requested music, the system 10 plays back the music with voice feedback from one of the recordings 28, 30, 32. As mentioned above, the voice feedback may be any type of feedback, such as a DJ-like experience in some embodiments. The voice may introduce a song, for example. In various embodiments, the voice may be played entirely before the start of a song, partially overlapping with the beginning of the song, and/or at the end of the song. Some of these variations are described in more detail below.

Figure 2:
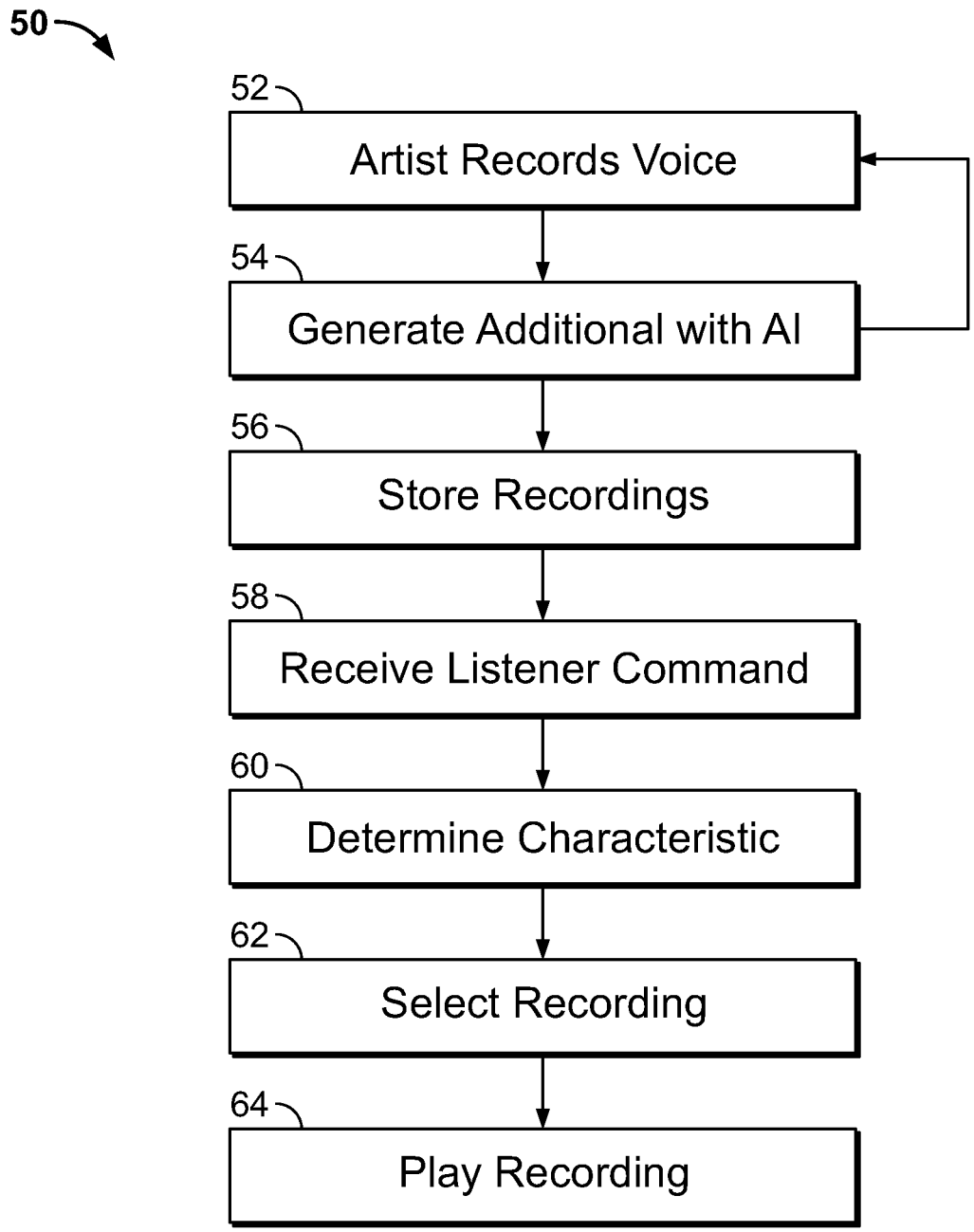
FIG. 2 is a flow chart illustrating a method for providing a customized voice interface to a user, using a media-playback system.

FIG. 2 is a flow chart, illustrating a method 50 for providing voice feedback for a user interface, as just described in relation to FIG. 1. For the description of FIG. 2, the method 50 will be described in relation to only one voice artist 12. As is apparent from the foregoing description, however, any number of voice artists 12, 14, 16 may be recorded for the system 10, and there is no limit to the number of artists or voice recordings. With that said, the first step in the method 50 is to create a voice recording of a voice artist 52. As mentioned above, this recording may be any number of statements, questions, monologues, advertisements, and the like.

Next, the initial recordings of the voice artist are used to generate additional recordings in step 54. A variety of techniques can be used to generate additional recordings, including human curation and artificial intelligence ("AI"), (e.g., machine learning techniques or NLG). For example, a human curator or an artificial speech recognition systems (e.g., using neural networks or hidden Markov models) to separate out the words, syllables, and/or phonemes of the voice artist's initial recordings. Those words may then be pieced together in different combinations and orders to generate additional, different statements and/or questions in the voice artist's voice. Again, signals, such as song title, album title, track identifier (ID), as well as signals that define the context, such as whether the vehicle is moving, the lighting in the vehicle, etc., may be used as input to a trained neural net to generate or select relevant phrases and/or sentences. These first two steps 52, 54 of the method 50 may be repeated as many times as desired and in any time intervals desired. For example, Beyoncé may act as a voice artist and participate in an initial recording session 52, and her voice recordings may then be multiplied using AI. Weeks, months or even years later, Beyoncé may return to make further recordings. For example, a voice artist might want to make additional recordings before the release of a new album, to help promote the album. In some cases, a voice artist might return regularly to a studio or other recording venue to add further voice recordings. The initial recordings 20, 22, and 24 generated in step 52, and the multiplied recordings 28, 30, and 32 generated in step 54 or both may include any of a number of different types of recordings, even for one voice artist. For example, the artist may record his/her voice speaking at different tempos, for example to accompany different tempos of music. Alternatively or additionally, these different tempos may be generated using AI or NLG in the voice multiplication step 54. The voice artist may also record at different pitches, may sing some portions and speak or rap other portions, or any other conceivable variation in speech or other form of voice communication. Any of the variations that might be created during the initial recordings 52 by the voice artist may alternatively be generated by AI or NLG in the multiplication step 54.

After generating the multiplied set(s) of voice recordings in step 54, these recordings may be stored 56, for example in computer memory residing within the media-playback system, in the cloud, in storage outside the system, or the like. When the system 10 receives a listener command requesting a piece of music 58, the system 10 then determines a characteristic 60 of the musical selection, a characteristic of the listener, or both. Using the determined characteristic(s), the system 10 then selects a voice recording 62 from the stored recordings and plays the recording to the listener 64, in the form of voice feedback. Again, the voice feedback may come before, during (overlapping with) and/or after a song, album, playlist or the like. In some embodiments, the system 10 may create a beat grid for a requested song and a beat grid for a corresponding voice recording and play the voice recording so that it overlaps with the beginning and/or ending of the song, in an on-beat (or "on-the-beat") manner. In some embodiments, the voice recording may include the voice artist saying his or her own name and/or the name of the listener. The voice recording may also ask the listener a question and thus initiate a conversation. For example, at the end of a music album, the voice recording may say, "That's the end of the album. What would you like to listen to next?" The listener may then respond, using his or her voice to input a listener command to select a next piece of music.

As mentioned above, the system 10 may be configured to identify any given music characteristic (or multiple music characteristics) of the music selected for playback by the listener. In one example, the system 10 may simply determine the style of music selected and may pair the voice recording with the style of music. In some embodiments, for example, the system 10 may store recordings of one voice artist of each of a number of different musical styles, and any time a particular style of music is chosen by a listener for playback, that voice artist's voice is used as the virtual DJ to accompany the playback. Of course, other music characteristics may be identified and used to pair voice feedback with the selected music as well, such as but not limited to tempo, pitch, specific artist who recorded the music, specific person who created a playlist and the like. Alternatively or additionally, one or more characteristics of the listener may be used to determine what voice feedback to play with a selected piece of music. One example is the listener's location. For example, if the listener is driving through Ireland, a voice artist with an Irish accent or an Irish celebrity may be used as the voice feedback DJ. This functionality allows a global music-playback system to appear more local in character. In a similar way, the listener may be able to log into the system 10 and provide listener information, which may be used in future voice feedback decisions. Such information may include the listener's home town, current state or city of residence, favorite style(s) of music, favorite musician(s) and/or the like. In general, any characteristic or set of characteristics of the music selected by the listener or of the listener himself/herself may be used by the system 10 to determine which voice recordings to be played as voice feedback.

Figure 3:
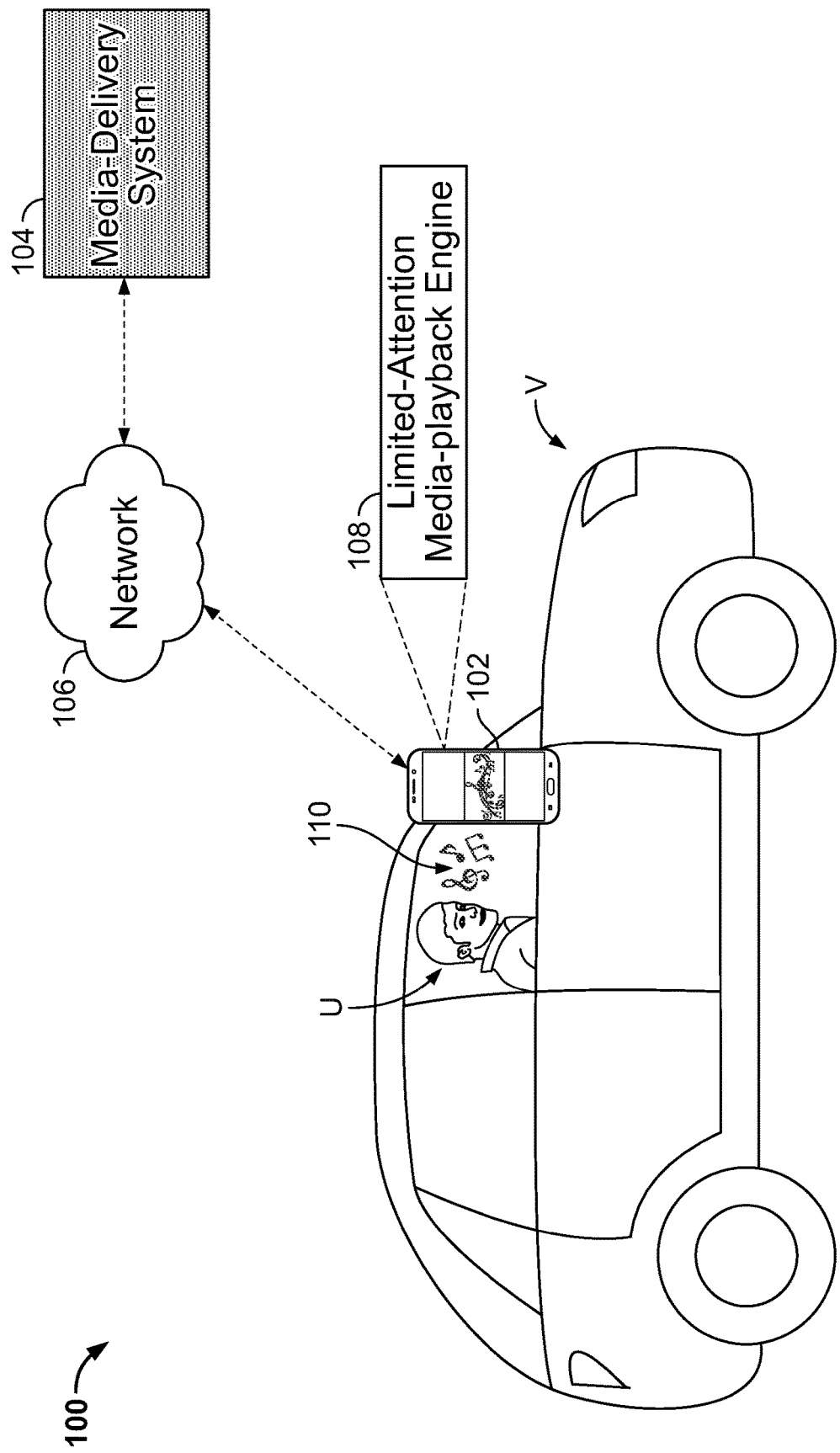
FIG. 3 illustrates an example media-playback system for media content playback during travel.

FIG. 3 illustrates an example media-playback system 100 for media content playback during travel. In various embodiments, the voice feedback system 10 described above may be incorporated, at least partially, into the media-playback system 100, and the voice feedback method 50 may be carried out via the media-playback system 100. The example system 100 includes a media-playback device 102 and a media-delivery system 104. The media-playback device 102 includes a limited-attention media-playback engine 108, of which the voice feedback system may be a part. The system 100 communicates across a network 106. Also shown, is a user U who is travelling in a vehicle V.

The media-playback device 102 plays back media content items to produce media output 110. In some embodiments, the media content items are provided by the media-delivery system 104 and transmitted to the media-playback device 102 using the network 106. A media content item may include audio, video, or other types of media content, which may be stored in any format suitable for storing media content. Non-limiting examples of media content items include songs, albums, audiobooks, music videos, movies, television episodes, podcasts, other types of audio or video content, and portions or combinations thereof.

The media-playback device 102 plays media content for the user during travel or other activities. The media content that is played back may be selected based on user input or may be selected without user input. The media content may be selected for playback without user input by either the media-playback device 102 or the media-delivery system 104. For example, media content can be selected for playback without user input, based on stored user profile information, location, travel conditions, current events, and other criteria. User profile information includes but is not limited to user preferences and historical information about the user's consumption of media content. (User profile information is one example of listener characteristics that may be used by the system 100 to select a particular voice feedback for a selected piece of music.) User profile information can also include libraries and/or playlists of media content items associated with the user. User profile information can also include information about the user's relationships with other users (e.g., associations between users that are stored by the media-delivery system 104 or on a separate social media site). Although the media-playback device 102 is shown as a separate device in FIG. 3, the media-playback device 102 can also be integrated with the vehicle (e.g., as part of a dash-mounted vehicle infotainment system).

The limited-attention media-playback engine 108 generates interfaces for selecting and playing back media content items. In at least some embodiments, the limited-attention media-playback engine 108 generates interfaces that are configured to be less distracting to a user and require less attention from the user than a standard interface. Embodiments of the limited-attention media-playback engine 108 are illustrated and described further throughout.

Figure 4:
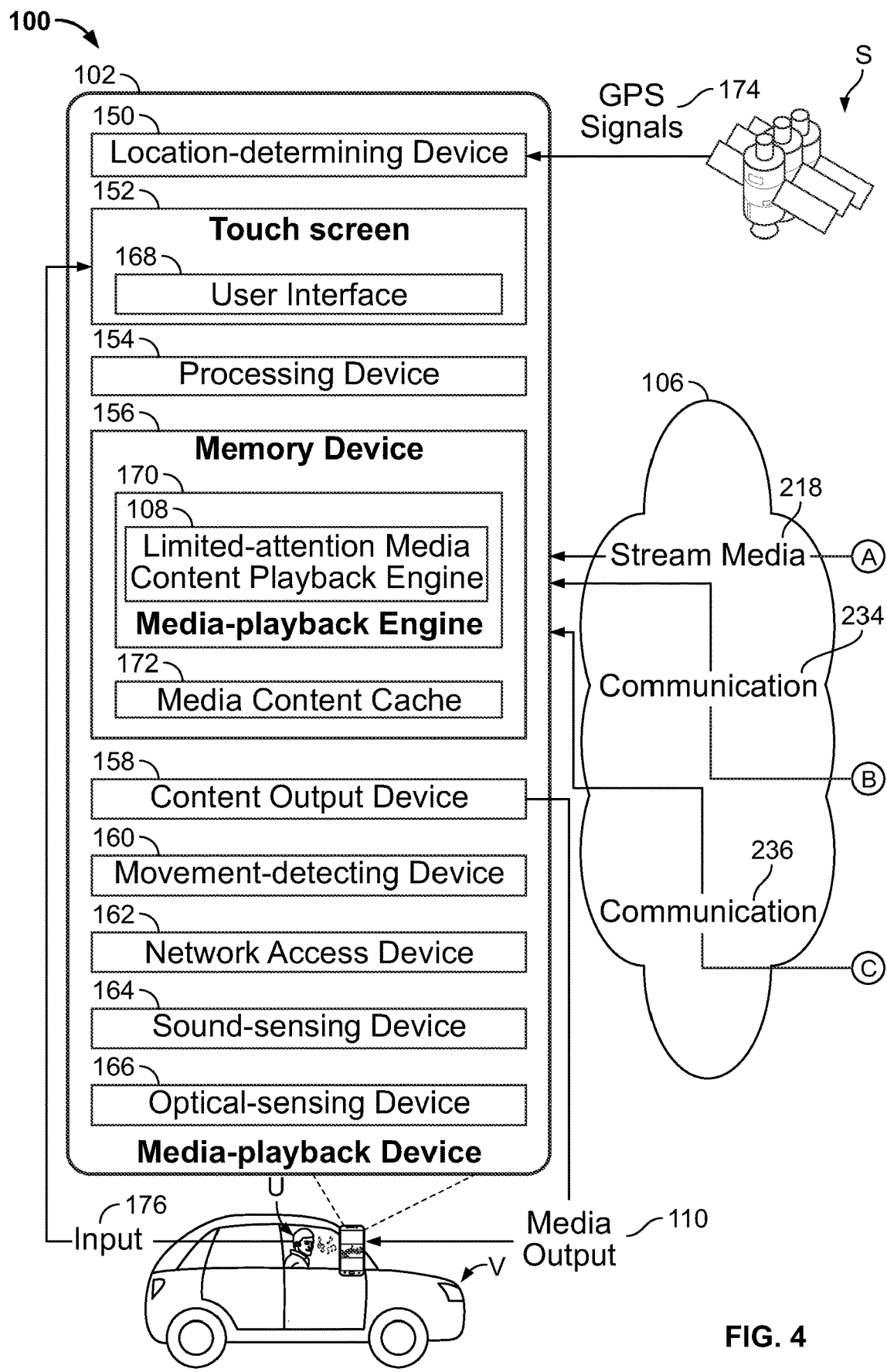
FIG. 4 is a schematic illustration of the example media-playback system of FIG. 1.
Figure 4:
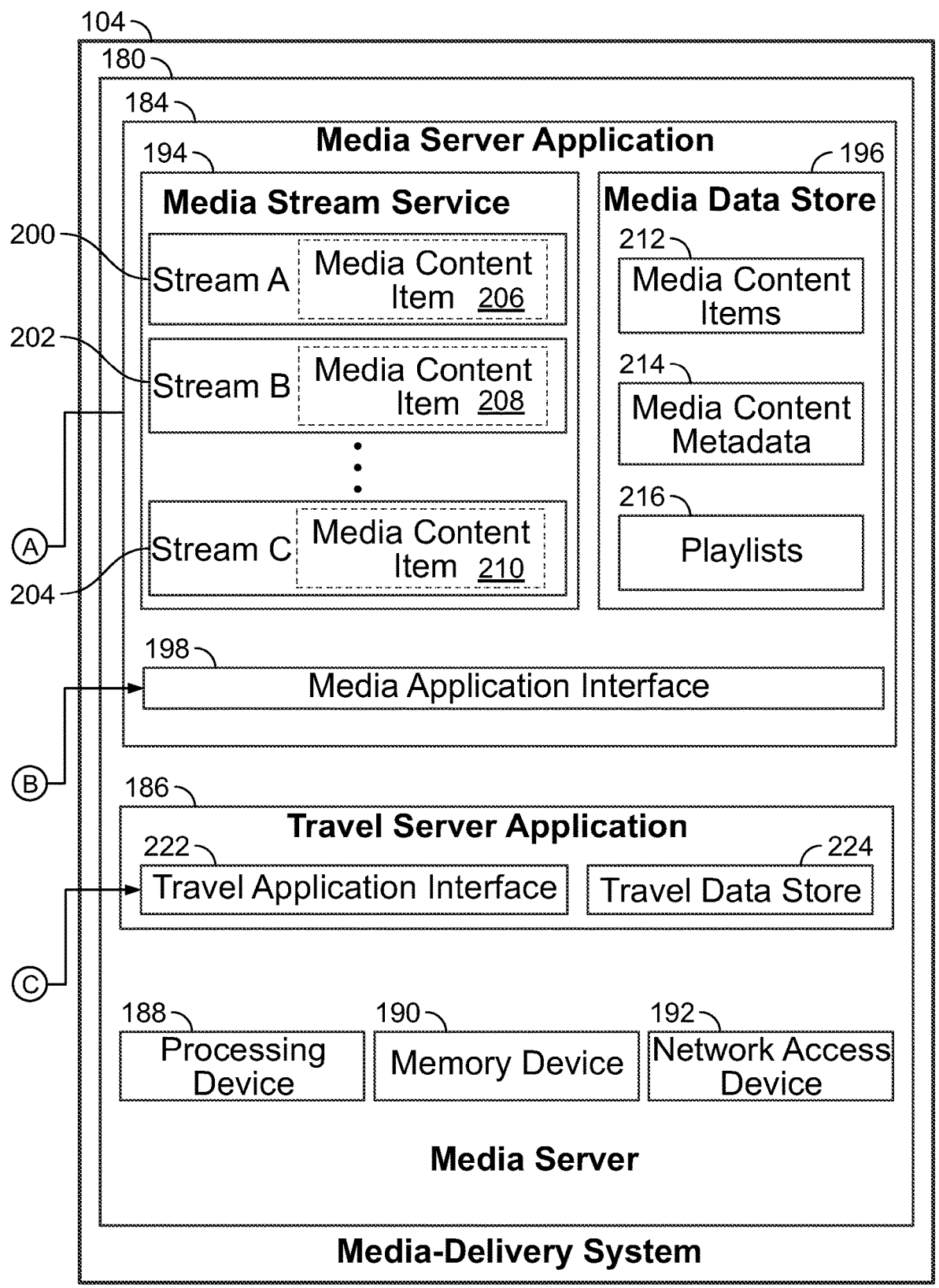

FIG. 4 is a schematic illustration of an example system 100 for media content playback during travel. In FIG. 4, the media-playback device 102, the media-delivery system 104, and the network 106 are shown. Also shown are the user U in the vehicle V, and satellites S.

As noted above, the media-playback device 102 plays media content items. In some embodiments, the media-playback device 102 plays media content items that are provided (e.g., streamed, transmitted, etc.) by a system external to the media-playback device, such as the media-delivery system 104, another system, or a peer device. Alternatively, in some embodiments, the media-playback device 102 plays media content items stored locally on the media-playback device 102. Further, in at least some embodiments, the media-playback device 102 plays media content items that are stored locally, as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is an in-dash vehicle computer, laptop computer, desktop computer, television, gaming console, set-top box, network appliance, blue-ray or DVD player, media player, stereo, or radio.

In at least some embodiments, the media-playback device 102 includes a location-determining device 150, a touch screen 152, a processing device 154, a memory device 156, a content output device 158, a movement-detecting device 160, a network access device 162, a sound-sensing device 164, and an optical-sensing device 166. Other embodiments may include additional, different, or fewer components. For example, some embodiments do not include one or more of the location-determining device 150, the touch screen 152, the sound-sensing device 164, and the optical-sensing device 166.

The location-determining device 150 is a device that determines the location of the media-playback device 102. In some embodiments, the location-determining device 150 uses one or more of the following technologies: Global Positioning System (GPS) technology which may receive GPS signals 174 from satellites S, cellular triangulation technology, network-based location identification technology, Wi-Fi positioning systems technology, and combinations thereof. Information from the location-determining device 150 may be used, in some embodiments, to help the system 100 select a voice feedback recording to accompany a selected piece of music, as discussed above.

The touch screen 152 operates to receive an input 176 from a selector (e.g., a finger, stylus, etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 168 for interacting with the media-playback device 102. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processing devices, field-programmable gate arrays, or other electronic circuits.

The memory device 156 operates to store data and instructions. In some embodiments, the memory device 156 stores instructions for a media-playback engine 170 that includes the limited-attention media-playback engine 108. In some embodiments, the media-playback engine 170 selects and plays back media content and generates interfaces for selecting and playing back media content items. As described above, the limited-attention media-playback engine 108 also generates interfaces for selecting and playing back media content items.

In at least some embodiments, the limited-attention media-playback engine 108 generates interfaces that are configured to be less distracting to a user and require less attention from the user than other interfaces generated by the media-playback engine 170. For example, interfaces generated by the limited-attention media-playback engine 108 may include fewer features than the other interfaces generated by the media-playback engine 170. These interfaces generated by the limited-attention media-playback engine 108 may make it easier for the user to interact with the media-playback device 102 during travel or other activities that require the user's attention.

Some embodiments of the memory device also include a media content cache 172. The media content cache 172 stores media content items, such as media content items that have been previously received from the media-delivery system 104. The media content items stored in the media content cache 172 may be stored in an encrypted or unencrypted format. The media content cache 172 can also store decryption keys for some or all of the media content items that are stored in an encrypted format. The media content cache 172 can also store metadata about media content items, such as title, artist name, album name, length, genre, mood, era, etc. The media content cache 172 can also store playback information about the media content items, such as the number of times the user has requested to playback the media content item or the current location of playback (e.g., when the media content item is an audiobook, podcast, or the like for which a user may wish to resume playback).

The memory device 156 typically includes at least some form of computer-readable media. Computer readable media includes any available media that can be accessed by the media-playback device 102. By way of example, computer-readable media include computer readable storage devices and computer readable communication media.

Computer readable storage devices includes volatile and nonvolatile, removable and non-removable media implemented in any physical device configured to store information such as computer readable instructions, data structures, program modules, or other data. Computer readable storage devices include, but are not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media-playback device 102. In at least some embodiments, computer readable storage devices are non-transitory computer readable storage devices.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 110 for the user U that is directed into an interior cabin of the vehicle V. Examples of the content output device 158 include a speaker assembly comprising one or more speakers, an audio output jack, a Bluetooth transmitter, a display panel, and a video output jack. Other embodiments are possible as well. For example, the content output device 158 may transmit a signal through the audio output jack or Bluetooth transmitter that can be used to reproduce an audio signal by a connected or paired device such as headphones, speaker system, or vehicle head unit.

The movement-detecting device 160 senses movement of the media-playback device 102. In some embodiments, the movement-detecting device 160 also determines an orientation of the media-playback device 102. In at least some embodiments, the movement-detecting device 160 includes one or more accelerometers or other motion-detecting technologies or orientation-detecting technologies. As an example, the movement-detecting device 160 may determine an orientation of the media-playback device 102 with respect to a primary direction of gravitational acceleration. The movement-detecting device 160 may detect changes in the determined orientation and interpret those changes as indicating movement of the media-playback device 102. The movement-detecting device 160 may also detect other types of acceleration of the media-playback device and interpret those accelerations as indicating movement of the media-playback device 102 too.

The network access device 162 operates to communicate with other computing devices over one or more networks, such as the network 106. Examples of the network access device include one or more wired network interfaces and wireless network interfaces. Examples of wireless network interfaces include infrared, BLUETOOTH® wireless technology, 802.11a/b/g/n/ac, and cellular or other radio frequency interfaces.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more vehicle area networks, local area networks (LANs), metropolitan area networks, subnets, wide area networks (such as the Internet), or can be implemented at another scale. Further, in some embodiments, the network 106 includes multiple networks, which may be of the same type or of multiple different types.

The sound-sensing device 164 senses sounds proximate the media-playback device 102 (e.g., sounds within a vehicle in which the media-playback device 102 is located). In some embodiments, the sound-sensing device 164 comprises one or more microphones. For example, the sound-sensing device 164 may capture a recording of sounds from proximate the media-playback device 102. These recordings may be analyzed by the media-playback device 102 using speech-recognition technology to identify words spoken by the user. The words may be recognized as commands from the user that alter the behavior of the media-playback device 102 and the playback of media content by the media-playback device 102. The words and/or recordings may also be analyzed by the media-playback device 102 using natural language processing and/or intent-recognition technology to determine appropriate actions to take based on the spoken words. Additionally or alternatively, the sound-sensing device may determine various sound properties about the sounds proximate the user such as volume, dominant frequency or frequencies, etc. These sound properties may be used to make inferences about the environment proximate to the media-playback device 102 such as whether the sensed sounds are likely to correspond to a private vehicle, public transportation, etc. In some embodiments, recordings captured by the sound-sensing device 164 are transmitted to media-delivery system 104 (or another external server) for analysis using speech-recognition and/or intent-recognition technologies.

The optical-sensing device 166 senses optical signals proximate the media-playback device 102. In some embodiments, the optical-sensing device 166 comprises one or more light sensors or cameras. For example, the optical-sensing device 166 may capture images or videos. The captured images can be processed (by the media-playback device 102 or an external server such as the media-delivery system 104 to which the images are transmitted) to detect gestures, which may then be interpreted as commands to change the playback of media content. Similarly, a light sensor can be used to determine various properties of the environment proximate the user computing device, such as the brightness and primary frequency (or color or warmth) of the light in the environment proximate the media-playback device 102. These properties of the sensed light may then be used to infer whether the media-playback device 102 is in an indoor environment, an outdoor environment, a private vehicle, public transit, etc.

The media-delivery system 104 comprises one or more computing devices and provides media content items to the media-playback device 102 and, in some embodiments, other media-playback devices as well. The media-delivery system 104 includes a media server 180. Although FIG. 4 shows a single media server 180, some embodiments include multiple media servers. In these embodiments, each of the multiple media servers may be identical or similar and may provide similar functionality (e.g., to provide greater capacity and redundancy, or to provide services from multiple geographic locations). Alternatively, in these embodiments, some of the multiple media servers may perform specialized functions to provide specialized services (e.g., services to enhance media content playback during travel or other activities, etc.). Various combinations thereof are possible as well.

The media server 180 transmits stream media 218 to media-playback devices such as the media-playback device 102. In some embodiments, the media server 180 includes a media server application 184, a travel server application 186, a processing device 188, a memory device 190, and a network access device 192. The processing device 188, memory device 190, and network access device 192 may be similar to the processing device 154, memory device 156, and network access device 162 respectively, which have each been previously described.

In some embodiments, the media server application 184 streams music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 4, the media application interface 198 receives communication 234 from the media-playback engine 170.

In some embodiments, the media data store 196 stores media content items 212, media content metadata 214, and playlists 216. The media data store 196 may comprise one or more databases and file systems. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212 and. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era. The playlists 216 may include user-created playlists, which may be available to a particular user, a group of users, or to the public.

The travel server application 186 provides travel-specific functionality for providing media content items and interfaces for accessing media content items to media-playback devices. In some embodiments, the travel server application 186 includes a travel application interface 222 and a travel data store 224.

The travel application interface 222 can receive requests or other communication from media-playback devices or other systems, to retrieve travel information and media content items for playback during travel. For example, in FIG. 4, the travel application interface 222 receives communication 236 from the media-playback engine 170.

The travel application interface 222 can also generate interfaces that are transmitted to the media-playback device 102 for use by the limited-attention media-playback engine 108. In some embodiments, the travel application interface 222 generates limited-attention interfaces by modifying other interfaces to identify (e.g., with tags) user interface elements that behave differently or should be rendered differently on a limited-attention interface.

Additionally, the travel server application 186 can process data and user input information received from the media-playback device 102. In some embodiments, travel server application 186 operates to transmit information about the suitability of one or more media content items for playback during travel. In some embodiments, the travel server application 186 may provide a list of media content items that are suited to particular geographic locations, travel conditions, modes of travel, user preferences, etc.

For example, the travel server application 186 may store metadata and other information that associates media content items with geographic locations, forms of travel, travel conditions, etc. in the travel data store 224. The travel server application 186 may also store information that associates media content items with an individual or group of users' preferences for consuming that media content during travel in the travel data store 224. The travel data store 224 may comprise one or more files or databases. The travel data store 224 can also comprise files, tables, or fields in the media data store 196.

In some embodiments, the travel data store 224 stores travel media metadata. The travel media metadata may include various types of information associated with media content items, such as the media content items 212. In some embodiments, the travel data store 224 provides information that may be useful for selecting media content items for playback during travel. For example, in some embodiments, the travel data store 224 stores travel scores for media content items that correspond to the suitability of particular media content items for playback during travel. As another example, in some embodiments, the travel data store 224 stores timestamps (e.g., start and end points) that identify portions of media content items that are particularly well-suited for playback during travel (or other activities).

Each of the media-playback device 102 and the media-delivery system 104 can include additional physical computer or hardware resources. In at least some embodiments, the media-playback device 102 communicates with the media-delivery system 104 via the network 106.

Although in FIG. 4 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 4 illustrates a streaming media based system for media playback during travel, other embodiments are possible as well. For example, in some embodiments, the media-playback device 102 includes a media data store 196 and the media-playback device 102 is configured to select and playback media content items without accessing the media-delivery system 104. Further in some embodiments, the media-playback device 102 operates to store previously streamed media content items in a local media data store (e.g., the media content cache 172).

In at least some embodiments, the media-delivery system 104 can be used to stream, progressively download, or otherwise communicate music, other audio, video, or other forms of media content items to the media-playback device 102 for playback during travel on the media-playback device 102. In accordance with an embodiment, a user U can direct the input 176 to the user interface 168 to issue requests, for example, to playback media content for playback during travel on the media-playback device 102.

Figure 5A:
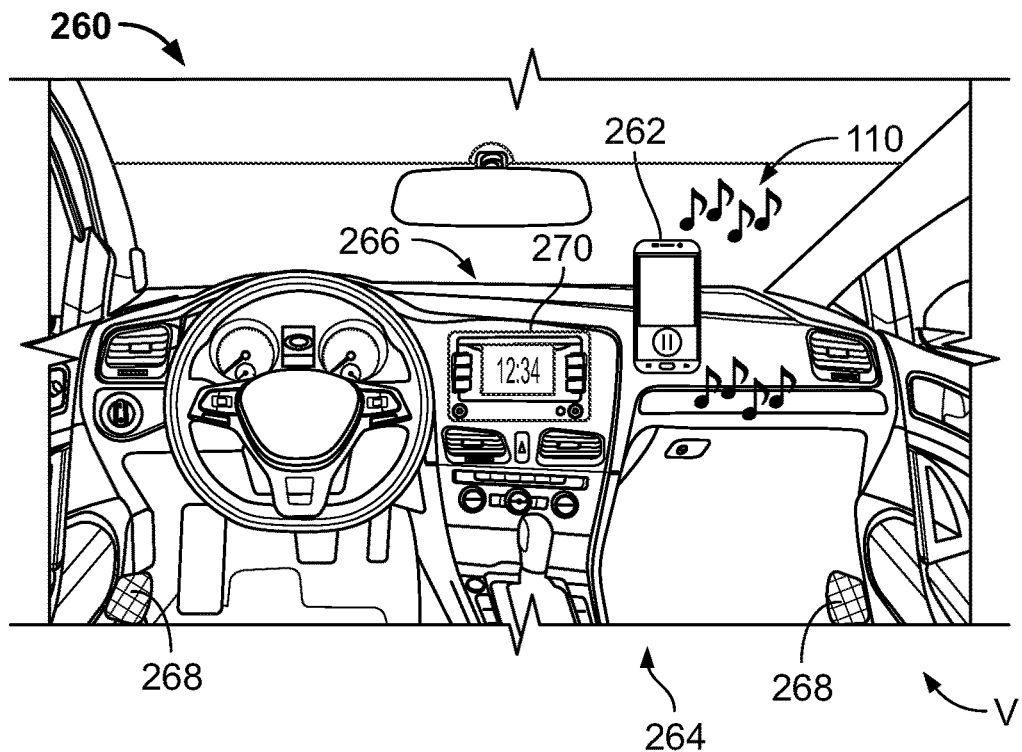
FIG. 5A is a schematic diagram of an embodiment of the media-playback system of FIG. 3.

FIG. 5A is a schematic diagram of an embodiment of a media-playback system 260 shown within an interior cabin of the vehicle V. The media-playback system 260 is an example of the media-playback system 100.

In this example, the media-playback system 260 includes a media-playback device 262. The media-playback device 262 is an embodiment of the media-playback device 102. Although not shown in this figure, some embodiments of the media-playback system 260 also include a media-delivery system such as the media-delivery system 104.

Also shown in this figure, is a vehicle media-playback system 264. The vehicle media-playback system 264 is capable of generating media output 110 within the interior cabin of the vehicle V. An example of the vehicle media-playback system 264 is illustrated and described with respect to FIG. 6.

As shown in FIG. 5A, the vehicle media-playback system 264 includes a vehicle head unit 266 and a speaker assembly 268. The vehicle head unit 266 receives or generates media content signals from one or more sources. As shown in FIG. 4, the vehicle head unit 266 includes a display device 270, which can be used to display information about the selected or available sources of media content. In some embodiments, the display device 270 can also display media content. Typically, the vehicle head unit 266 also includes a user input assembly that is usable to control the vehicle media-playback system 264 and to select a source of media content. The vehicle head unit 266 then transmits those signals to output devices such as the speaker assembly 268 (sometimes via an amplifier). In some embodiments, the vehicle head unit 266 also generates image or video content signals that can be transmitted to the display device 270 or another device for display.

In FIG. 5A, the vehicle media-playback system 264 is not being used to generate media output. Instead, the media-playback device 262 is generating media output 110 directly (e.g., through a speaker or other content output device of the media-playback device 262).

Figure 5B:
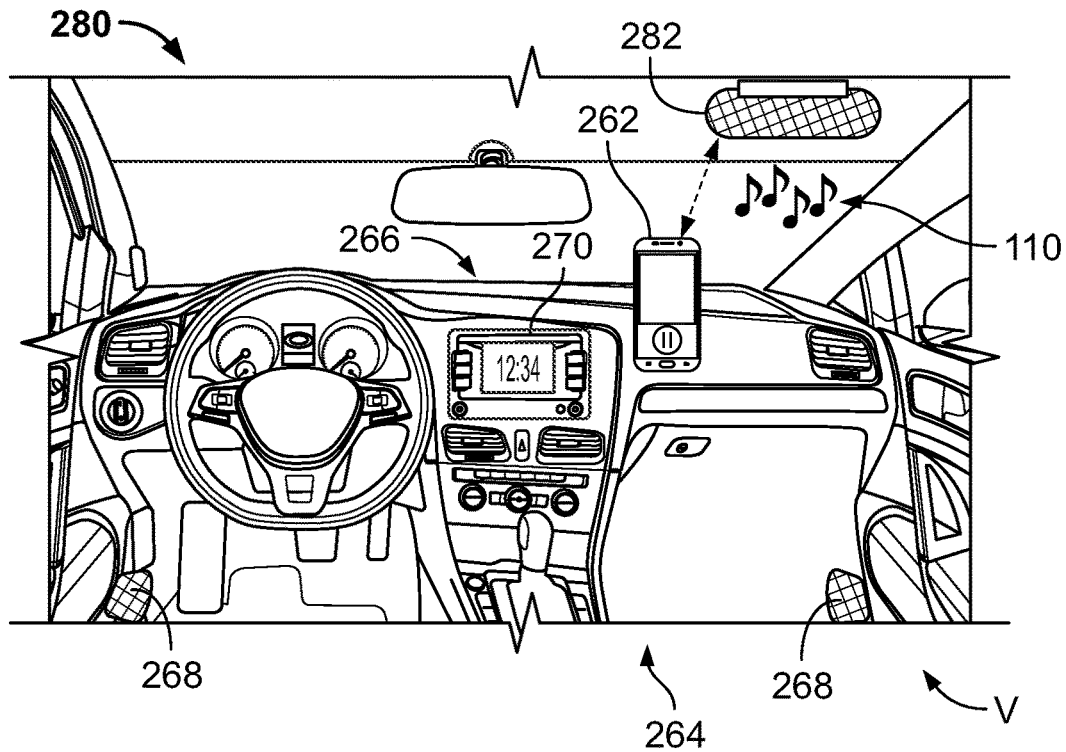
FIG. 5B is a schematic diagram of another embodiment of the media-playback system of FIG. 3.

FIG. 5B is a schematic diagram of an embodiment of a media-playback system 280. The media-playback system 280 is an example of the media-playback system 100. The media-playback system 280 includes the media-playback device 262 and an external speaker assembly 282. The vehicle media-playback system 264 is also shown in FIG. 5B.

The external speaker assembly 282 generates media output 110 based on a signal received from the media-playback device 262. The external speaker assembly 282 can include one or more speakers. The external speaker assembly 282 can also include a mechanical apparatus for attachment to the vehicle. Although alternatives are possible, in FIG. 5B, the external speaker assembly 282 is attached to a sun visor of the vehicle.

In some embodiments, the media-playback device 262 connects to the external speaker assembly 282 using Bluetooth. The media-playback device 262 then transmits an audio signal to the external speaker assembly 282 via Bluetooth, which is then used by the external speaker assembly 282 to generate the media output 110. In some embodiments, the media-playback device 262 and the external speaker assembly 282 communicate using a different wireless protocol. Further, in some embodiments, the media-playback device 262 can transmit a media content signal to the external speaker assembly 282 via a cable (e.g., an analog or digital audio cable, a universal serial bus (USB) cable).

In FIG. 5B, the vehicle media-playback system 264 is not being used to generate media output. Instead, the media-playback device 262 is transmitting a signal to the external speaker assembly 282, which generates the media output 110 without using the vehicle media-playback system 264.

Figure 5C:
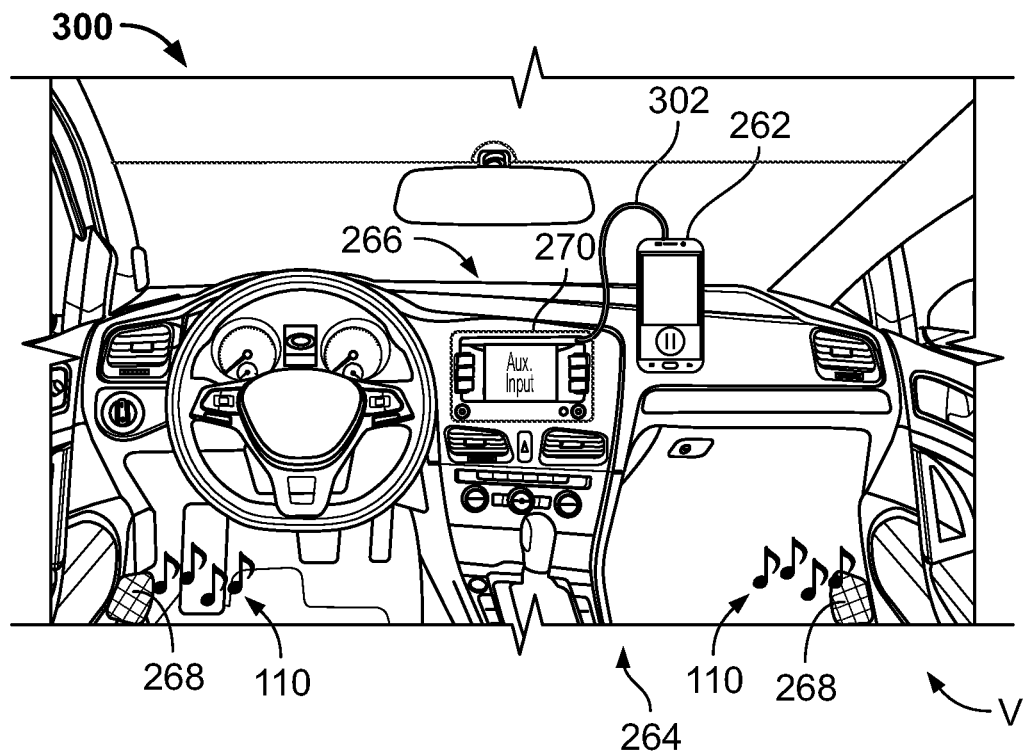
FIG. 5C is a schematic diagram of another embodiment of the media-playback system of FIG. 3.

FIG. 5C is a schematic diagram of an embodiment of a media-playback system 300. The media-playback system 300 is an example of the media-playback system 100. The media-playback system 300 includes the media-playback device 262, the vehicle media-playback system 264, and a cable 302.

The cable 302 connects the media-playback device 262 to the vehicle media-playback system 264. Although alternatives are possible, the cable 302 can be an analog audio cable that is connects an audio output device of the media-playback device 262 (e.g., a headphone jack) to a wired input device of the vehicle media-playback system 264 (e.g., an auxiliary input jack). In alternative embodiments, the cable 302 is a USB cable that connects the media-playback device 262 to the vehicle media-playback system 264.

As shown in FIG. 5C, the display device 270 indicates that the vehicle media-playback system 264 is generating media output 110 based on a signal received from an auxiliary input. The media output 110 is played within the interior cabin of the vehicle by the vehicle media-playback system 264 using the speaker assembly 268.

Figure 5D:
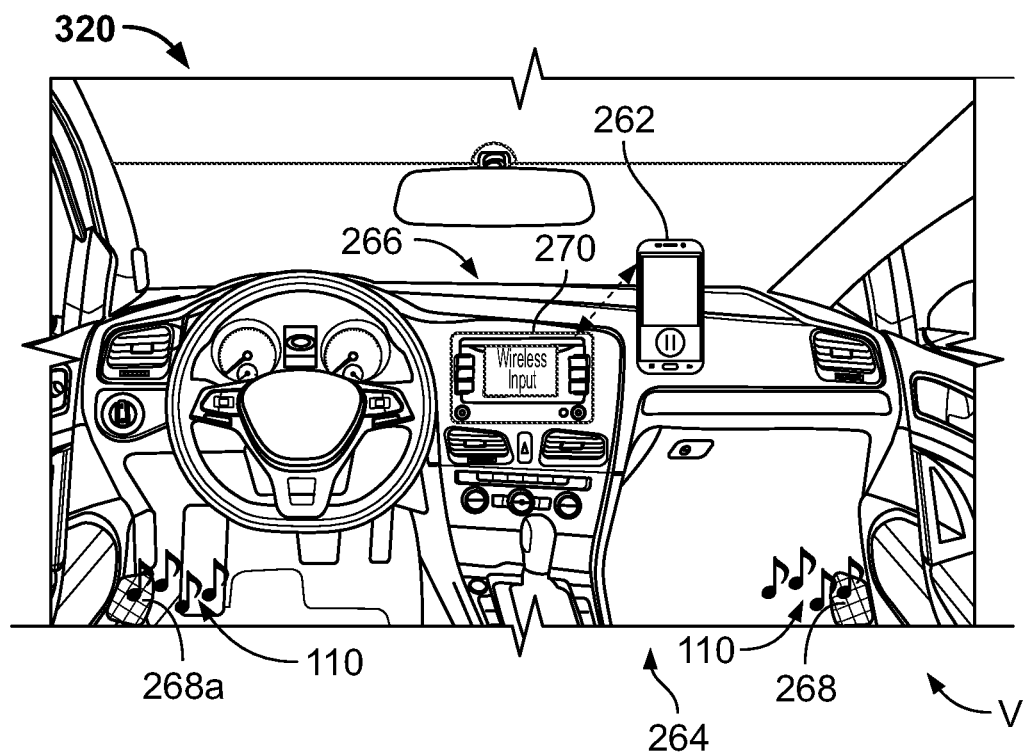
FIG. 5D is a schematic diagram of another embodiment of the media-playback system of FIG. 3.

FIG. 5D is a schematic diagram of an embodiment of a media-playback system 320. The media-playback system 320 is an example of the media-playback system 100. The media-playback system 320 includes the media-playback device 262 and the vehicle media-playback system 264. In this example, the media-playback device 262 and the vehicle media-playback system 264 are connected using a wireless communication protocol. Although alternatives are possible, the media-playback device 262 and the vehicle media-playback system 264 can be connected using Bluetooth. As an alternative, the media-playback device 262 and the vehicle media-playback system 264 can be connected via a Wi-Fi network (e.g., using an 802.11 wireless communication protocols) or another type of wireless connection.

As shown in FIG. 5D, the display device 270 indicates that the vehicle media-playback system 264 is generating media output 110 based on a signal received from a wireless input. The media output 110 is played within the interior cabin of the vehicle by the vehicle media-playback system 264 using the speaker assembly 268.

Figure 6:
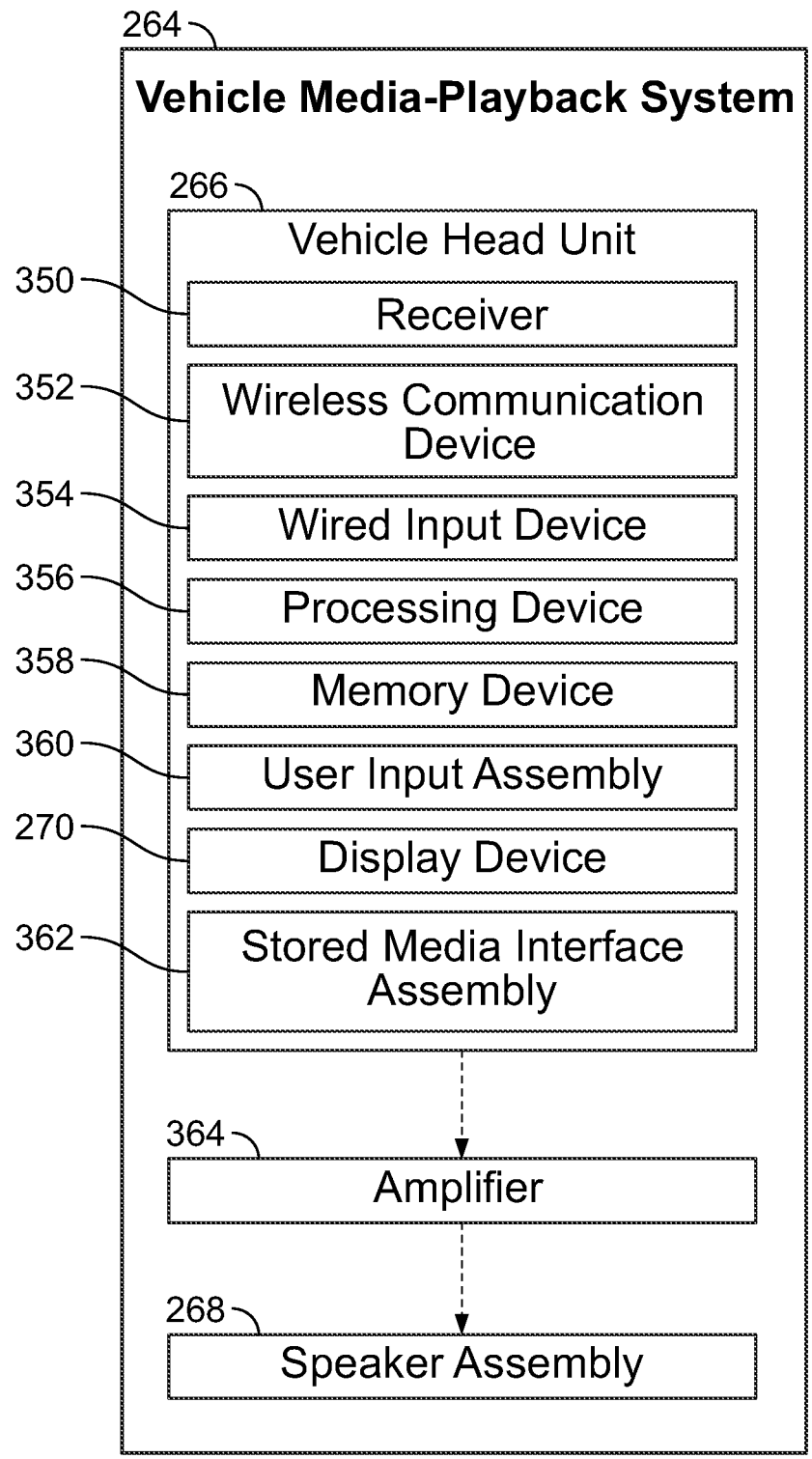
FIG. 6 is a schematic diagram of an embodiment of the vehicle media-playback system of FIG. 5A.

FIG. 6 is a schematic diagram of an embodiment of the vehicle media-playback system 264. In this example, the vehicle media-playback system 264 includes a vehicle head unit 266, an amplifier 364, and a speaker assembly 268.

The vehicle head unit 266 received user input and generates media content from various sources. In this example, the vehicle head unit 266 includes a receiver 350, a wireless communication device 352, a wired input device 354, a processing device 356, a memory device 358, a user input assembly 360, a display device 270, and a stored media interface assembly 362. The processing device 356 may be similar to the processing device 154 and the memory device 358 may be similar to the memory device 156.

The receiver 350 receives media content signals from various external sources. The received signals can then be used to generate media output by the vehicle media-playback system 264. The receiver 350 may comprise one or more tuners for receiving radio signals such as FM or AM radio signals. Additionally, the receiver 350 may comprise a receiver for receiving satellite radio signals.

The wireless communication device 352 communicates with other devices using wireless data signals. The wireless communication device 352 can include one or more of a Bluetooth transceiver and a Wi-Fi transceiver. The wireless data signal may comprise a media content signal such as an audio or video signal.

The wired input device 354 receives a cable for providing media content and/or commands. In some embodiments, the wired input device 354 can include an auxiliary input jack for receiving a plug that transmits an analog audio signals. The wired input device 354 can also include different or multiple input jacks for receiving plugs that transmit other types of analog or digital signals (e.g., USB, HDMI, Composite Video, YPbPr, DVI). In some embodiments, the wired input device 354 is also used to receive instructions from other devices.

The user input assembly 360 comprises one or more input devices for providing user input to the vehicle media-playback system 264. In some embodiments, the user input assembly 360 includes multiple knobs, buttons, and other types of input controls for adjusting volume, selecting sources and content, and adjusting various output parameters. In some embodiments, the various input devices are disposed on or near a front surface of the vehicle head unit 266. The various input devices can also be disposed on the steering wheel of the vehicle or elsewhere. Additionally or alternatively, the user input assembly 360 can include one or more touch sensitive surfaces, which can be incorporated in the display device 270.

The display device 270 displays information. In some embodiments, the display device 270 includes a liquid crystal display (LCD) panel for displaying textual information about content and/or settings of the vehicle media-playback system 264. The display device 270 can also include other types of display panels such as a light emitting diode (LED) panel. In some embodiments, the display device 270 can also display image or video content.

The stored media interface assembly 362 reads media content stored on a physical medium. In some embodiments, the stored media interface assembly 362 comprises one or more devices for reading media content from a physical medium such as a compact disc or cassette tape.

The amplifier 332 amplifies a signal received from the vehicle head unit 266 and transmits the amplified signal to the speaker assembly 268. In this manner, the media output 110 can be played back at a greater volume. The amplifier 332 may include a power source to power the amplification.

The speaker assembly 268 produces an audio output based on an electronic signal. The speaker assembly may comprise one or more speakers disposed at various locations within the vehicle. In some embodiments, separate signals are received for at least some of the speakers (e.g., to provide stereo or surround sound).

Figure 7:
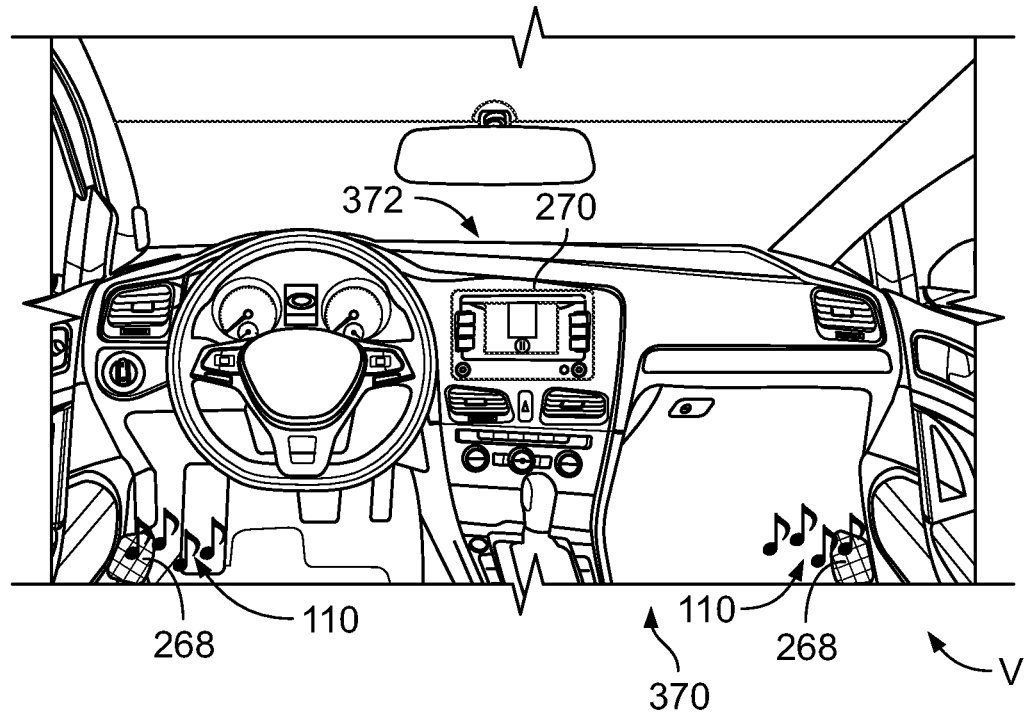
FIG. 7 is a schematic diagram of an embodiment of a vehicle media-playback system that incorporates a media-playback device.

FIG. 7 is a schematic diagram of an embodiment of a vehicle media-playback system 370 that incorporates a media-playback device. The vehicle media-playback system 370 is an example of the media-playback system 100. The vehicle media-playback system 370 includes a vehicle head unit 372 and the speaker assembly 268. In this example, the vehicle head unit 372 incorporates the components and functionality of both a media-playback device such as the media-playback device 102 and a vehicle head unit such as the vehicle head unit 266. As shown in FIG. 3D, the display device 270 is showing a user interface screen for selecting and playing back media content, which can, for example, be generated by the limited-attention media-playback engine 108. The media output 110 is played within the interior cabin of the vehicle by the vehicle media-playback system 370 using the speaker assembly 268. Although alternatives are possible, the vehicle media-playback system 370 often also includes navigation, climate control, and vehicle maintenance capabilities too.

Figure 8:
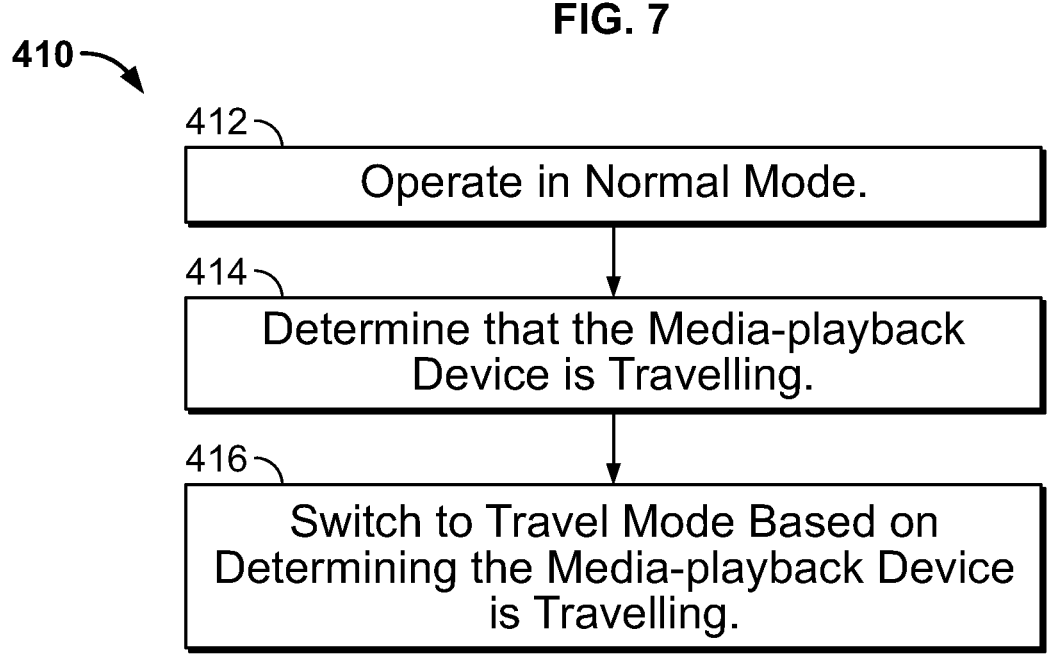
FIG. 8 illustrates an example method of media content playback during travel performed by some embodiments of the media-playback device of FIG. 3.

FIG. 8 illustrates an example method 410 of media content playback during travel performed by some embodiments of the media-playback device 102.

At operation 412, the media-playback device 102 operates in a normal mode. For example, in the normal mode user interfaces that are feature rich and include many options may be generated and displayed. The user interfaces generated in normal mode may include user-actuatable elements that allow the user to select media content items from large catalogs/lists, search for media content items, curate playlists of media content items, download media content items, adjust playback settings, and many other features.

At operation 414, it is determined that the media-playback device is travelling. Although alternatives are possible, it can be determined that the media-playback device is travelling based on connecting to a vehicle media-playback system (e.g., via Bluetooth or an audio output port). In some embodiments, the media-playback device determines that it is connected to a vehicle media-playback system based on a Bluetooth-device identifier associated with a device to which it is connected device. In some embodiments, the media-playback device determines that it is travelling based on detecting the movement of the media-playback device (e.g., based on the location-determining device and/or the movement-detecting device). For example, some embodiments determine that media-playback device is travelling when the movement-detecting device detects an acceleration that exceeds a pre-determined threshold. Similarly, some embodiments determine that the media-playback device is travelling based on determining that media-playback device is a moving at a speed that exceeds a predetermined threshold (e.g., as determined by a series of measurements by the movement determining device).

At operation 416, the media-playback device switches to a travel mode based on determining that the media-playback device is travelling. The travel mode may comprise a simplified user interface that is optimized for swipes and voice interaction. In some embodiments, when the media-playback device switches to travel mode a limited-attention user interface is generated. For example, the limited-attention user interface may include fewer user interface elements than the interface that is provided in normal mode. Additionally, the user interface elements that are included in the limited-attention user interface may be larger or otherwise simpler for a user to interact with.

In at least some embodiments, the limited-attention user interface includes a limited set of user interface elements that are related to selecting and playing-back media content. For example, the limited-attention user interface may include commands to skip the currently playing media content item. Additionally, embodiments of the limited-attention user interface include commands to return to a most recently played previous media-content item.

Some embodiments also include user interface elements or are receptive to inputs that switch to a different playlist or group of playlists. For example, some embodiments are configured to switch playlists with a list of playlists based on user input that is a swipe to the left or right on the touchscreen (e.g., the list of playlists may be but do not need to be related to a particular genre, theme, era, or any other grouping, the list of playlists can also be generated based on a user's recent interactions with the media-playback device such as recently played, created, or accessed playlists). Additionally, some embodiments are configured to switch to a different group of playlists based on a user input that is a swipe up or down on the touchscreen.

In some embodiments, upon entering travel mode the media-playback device begins playing back media content without any further user input (e.g., by resuming playback of a recently played media content item or playlist). In this manner, a user is not required to interact with the media-playback device at all to being playback when the media-playback device is operating in travel mode.

Additionally, in some embodiments, the media playback device generates an audio output that describes the currently playing media content item (e.g., the name of one or more of the currently playing playlist, media content item, artist). The audio output may be generated using text-to-speech technology based on metadata associated with the media content item. However, in some embodiment, the audio output is generated by playing a recording that includes a description (e.g., a recording by the artist, a disc jockey, or a playlist creator).

When operating in travel mode, some embodiments of the media-playback device can receive and respond to voice commands from users. For example, the media-playback device may listen for a certain keyword/phrase (e.g., "Hey Spotify") that users utter before speaking a command. The user's speech that follows the keyword/phrase is then recorded and processed (either locally or remotely) to determine an action desired by the user. Some embodiments support a limited set of keyword voice commands (e.g., "skip song," "next playlist," "pause," "play,"). Additionally, some embodiments include intent recognition technology that attempts to determine a user's intended command based on an unstructured spoken utterance from the user.

Some embodiments also activate an optical-sensing device (e.g., a camera) on the media-playback device in travel mode to capture user input gestures. For example, some embodiments are configured to interpret a side to side wave in front of the media-playback device as a skip command, while an up-and-down wave may be interpreted as a switch groups of playlists command. For example; the input gestures can be recognized using a motion recognition engine from a motion tracking system like the system developed by Crunchfish Ab of Malmo, Sweden, or the Kinect® system from Microsoft Corporation of Redmond, Wash.

In some embodiments the operation 414 also or alternatively determines whether the user is a driver or a passenger. In some embodiments the media-playback device operates in the travel mode when the operation 414 determines that the user is a driver. In other embodiments the media-playback device operates in a first travel mode when the user is a driver, and a second travel mode (different from the first travel mode) when the user is a passenger.

There are a variety of techniques that can be used to determine whether a user is a driver or a passenger. In one embodiment the media-playback device prompts the user to ask the user if he or she is driving, or alternatively whether he or she is a passenger. In some embodiments the system learns from the input provided by the user over time. A current or planned route can also be considered. In this way a routine daily commute from home to work and back or other frequent trips can be learned by the system and used to determine whether the user is a driver or a passenger based on past inputs from the user.

Other input devices of the media playback device can also be used to determine whether the user is a driver or a passenger. For example, the camera can be used to capture an image or video. The image can then be processed to identify a position of the subject or a portion of the subject in the image. Whether the passenger is on the left or the right side of the vehicle in the image can be determined and used to determine whether the user is a driver or a passenger (e.g., a driver if the user is on the left in many countries). If the image is taken while the user is touching the media-playback device 102, the image may include an image of the person's arm, and the position and/or shape of the arm in the image can be detected and used to determine the user's position in the car. Microphones can be used to analyze sounds in the vehicle, and used to predict whether the user is a driver or a passenger. Stereo microphones can also be used to identify the direction of sounds within the vehicle, such as to detect a direction of the user's voice and therefore the position of the user with respect to the media-playback device 102.

Figure 9:
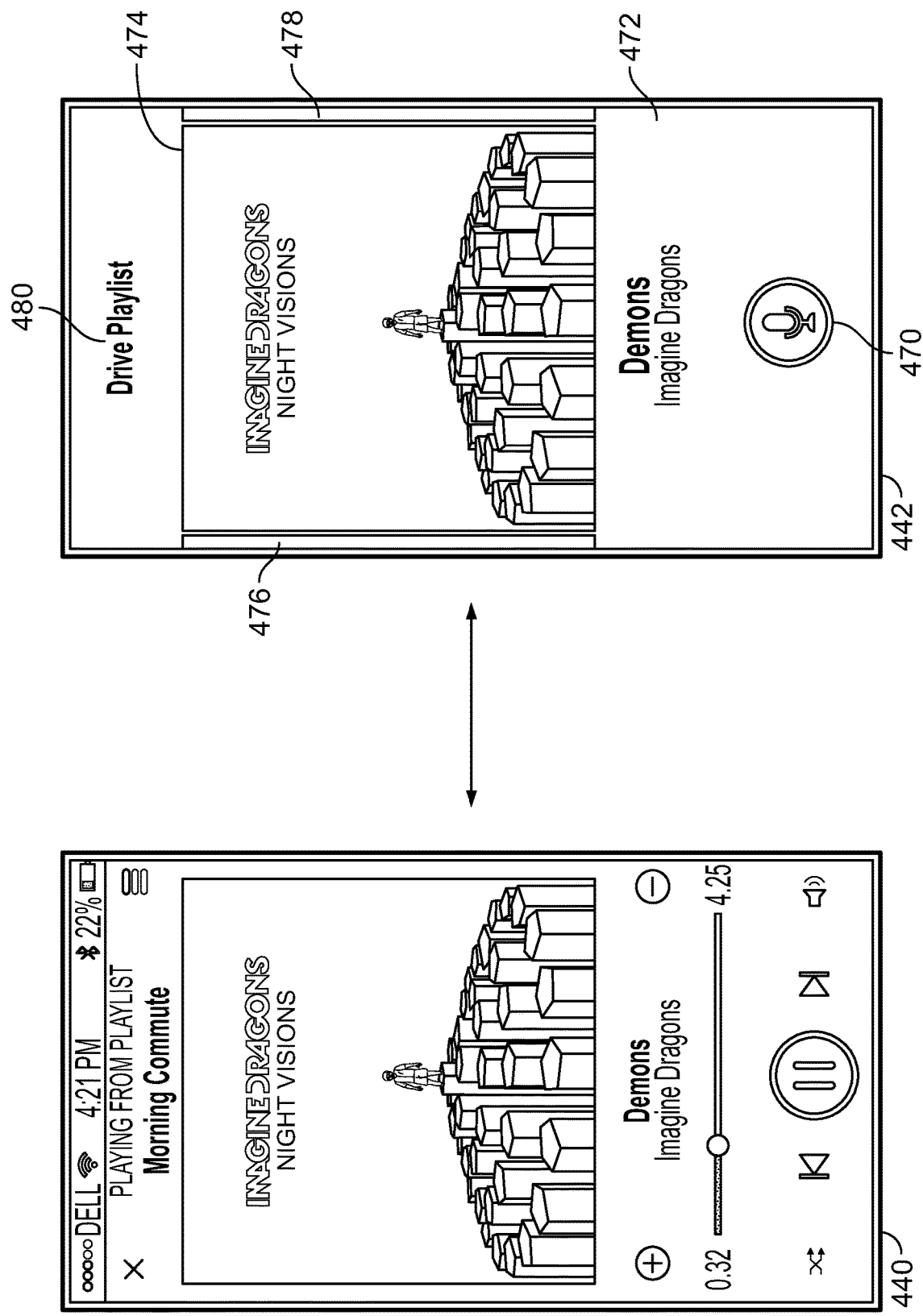
FIG. 9 includes schematic diagrams of a normal-mode user interface screen and a travel-mode user interface screen that are generated and displayed by some embodiments of the media-playback device of FIG. 3.

FIG. 9 includes schematic diagrams of a normal-mode user interface screen 440 and a travel-mode user interface screen 442 that are generated and displayed by some embodiments of the media-playback device 102. As can be seen, the normal-mode user interface screen 440 include more user-interface elements than the travel-mode user interface screen 442 and the travel-mode user interface screen 442 includes fewer user-interface elements than the normal-mode user interface screen 440.

For example, the normal-mode user interface screen 440 includes a set of playback controls (e.g., shuffle, previous, play/pause, next) along the bottom of the screen. The normal-mode user interface screen 440 also includes a timeline indicator that shows the current playback location within the media content item, elapsed time, and remaining time. The normal-mode user interface screen 440 displays the media content item name and artist in a first set of font sizes. The normal-mode user interface screen 440 also includes controls for adding the currently playing media content item to a playlist and accessing more information about the currently playing media content item and other related media content items. The normal-mode user interface screen 440 also includes a graphical representation of the currently playing media content item. Additionally, the normal-mode user interface screen 440 includes the title of the currently playing playlist and various controls for interacting with the playlist.

In contrast, the travel-mode user interface screen 442 includes fewer elements than the normal-mode user interface screen 440. In this example, the travel-mode user interface screen 442 includes voice command control 470, a textual description The travel-mode user interface screen 442 includes a voice command control 470, a textual description 472 of the name and artist of the media content item, a graphical representation 474 of the currently playing media content item, a graphical representation 476 of the previous media content item, a graphical representation 478 of the next media content item queued to play, and a textual description 480 of the playlist.

When the voice command control 470 is actuated, the media-playback device 102 captures audio which is then interpreted as a voice command. In some embodiments, the voice command control 470 is actuated with a single touch. In other embodiments, the voice command control 470 is actuated with a long press touch.

The textual description 472 displays the media content item name and artist using a second set of font sizes. In some embodiments, the font sizes in the second set of font sizes are larger than corresponding font sizes in the first set of font sizes used in normal-mode user interface screen 440 (i.e., the font size of the media content item name is larger in travel-mode user interface screen 442 than in the normal-mode user interface screen 440 and the font size of the artist name is larger in travel-mode user interface screen 442 than in normal-mode user interface screen 440).

The graphical representations 476 and 478 show the user the previously played media content item and the upcoming media content item, respectively. The graphical representations 476 and 478 may include an image that corresponds to the respective media content items. As shown in FIG. 9, the graphical representations 476 and 478 are portions of the associated image (e.g., the associated images may be cropped). Specifically, the graphical representation 476 is a rightmost portion of an image corresponding to its associated media content item and the graphical representation 478 is a leftmost portion of an image corresponding to its associated media content item. Although alternatives are possible, the graphical representation 476 may include no more than about 5% of the corresponding image, no more than about 10% of the corresponding image, no more than about 25% of the corresponding image, or a different percentage of the corresponding image. Similarly, the graphical representation 478 may include no more than about 5% of the corresponding image, no more than about 10% of the corresponding image, no more than about 25% of the corresponding image, or a different percentage of the corresponding image.

The textual description 480 of the playlist can include the name of the playlist and/or other information about the playlist, such as the number of media content items in the playlist. In some embodiments, the textual description 480 includes only the name of the playlist so as to minimize the amount of text displayed in travel mode.

In some embodiments, the travel-mode user interface screen 442 is free of graphical representations of selectable playback controls (e.g., shuffle, previous, play/pause, next), in contrast to the normal-mode user interface screen 440 in which the selectable playback controls are graphically displayed on the user interface. This provides a greatly simplified appearance. In other possible embodiments the travel-mode user interface screen 442 contains fewer selectable playback controls than the normal-mode user interface screen 440.

Figure 10:
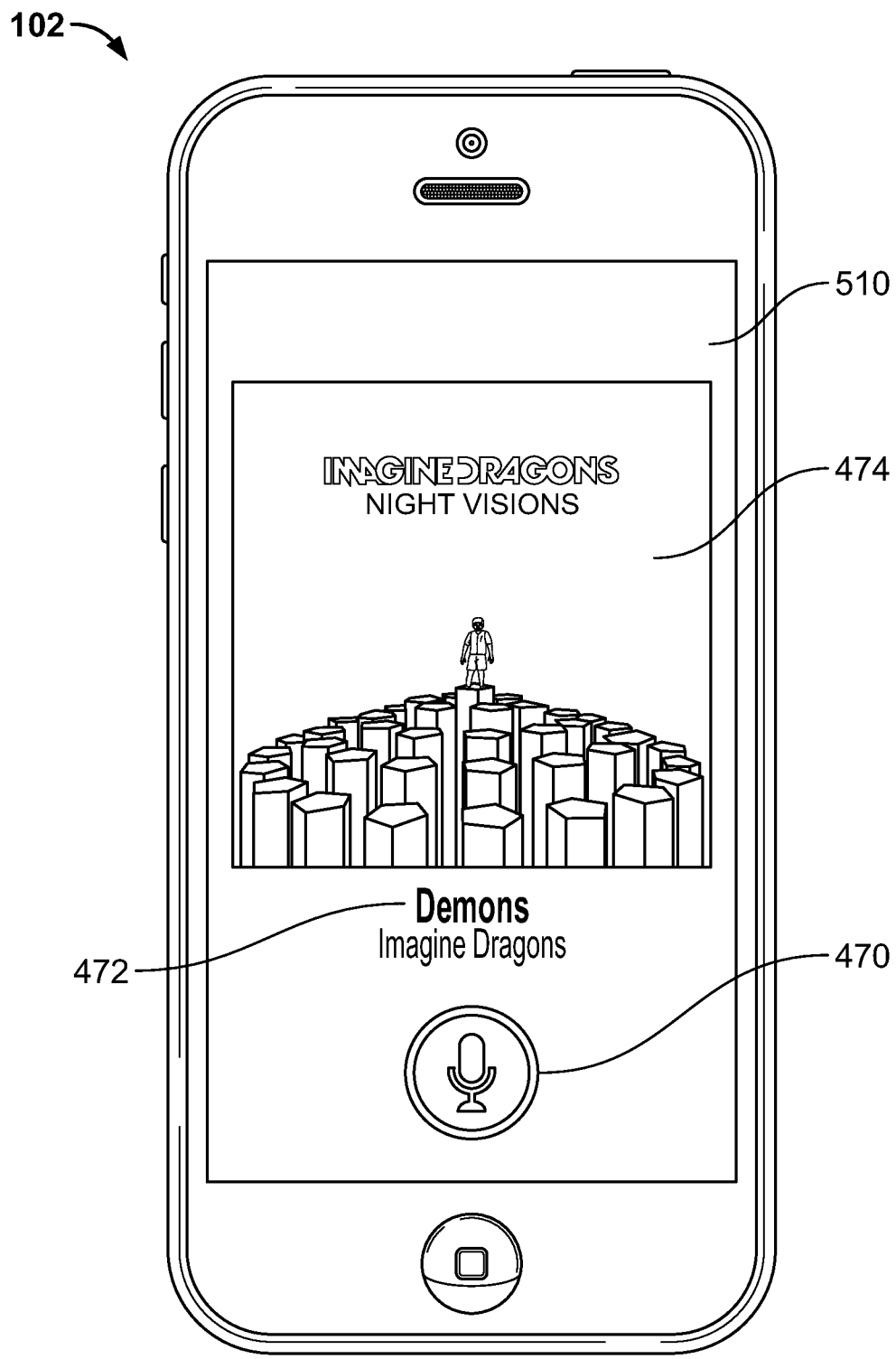
FIG. 10 is a schematic diagram of another embodiment of a user interface screen generated by some embodiments of the media-playback device of FIG. 3 when operating in a travel mode.

FIG. 10 is a schematic diagram of another embodiment of a user interface screen 510 generated by some embodiments of the media-playback device 102 when the media-playback device 102 is operating in a travel mode. The user interface screen 510 is similar to the travel-mode user interface screen 442 except that the user interface screen 510 includes fewer user interface elements. In this example, the user interface screen 510 includes the voice command control 470, textual description 472, and graphical representation 474. The user interface screen 510 does not include the graphical representation 476, the graphical representation 478, or the textual description 480. Other embodiments are possible that include more, fewer, or different elements in the travel mode too.

Figure 11:
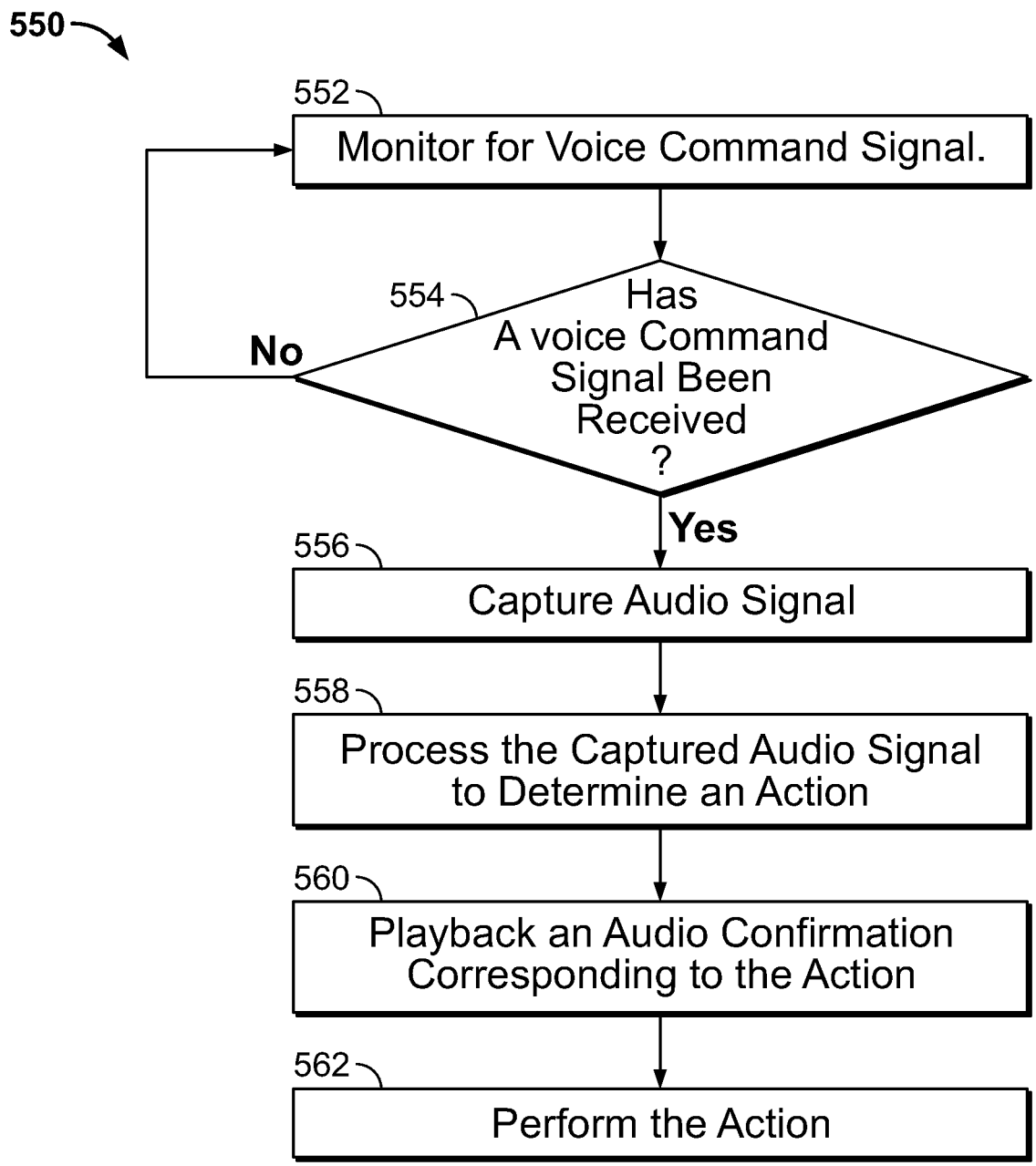
FIG. 11 illustrates an example method of receiving voice command input by a media content playback during travel performed by some embodiments of the media-playback device of FIG. 3.

FIG. 11 illustrates an example method 550 of receiving voice command input by a media content playback during travel performed by some embodiments of the media-playback device 102.

At operation 552, the media playback device monitors for a voice command signal. Monitoring for a voice command signal can comprise monitoring for a particular keyword or phrase to be spoken as described above. This monitoring may comprise capturing a short audio recording and processing the recording to determine whether the keyword or phrase is included in the recording. In at least some embodiments, the processing is performed locally by the media-playback device 102.

Additionally or alternatively, monitoring for a voice command signal can include monitoring for a particular touch input or gesture. For example, some embodiments include a voice command control on a user interface that when actuated generates a voice command signal. For example, At operation 554, it is determined whether a voice command signal has been received. If so, the method proceeds to operation 556. If not, the method returns to operation 552 to continue monitoring for a voice command signal.

At operation 556, an audio signal is captured. The audio signal can be captured by the audio-capture device of the media-playback device. In some embodiments, an audio signal of a predetermined length is captured. Alternatively or additionally, an audio signal is captured until a property of the captured audio signal meets a particular condition. For example, audio capture may continue until the captured audio meets a condition indicating that no one is speaking (e.g., the volume of the audio signal within a particular frequency band corresponding to human speech is below a particular threshold for a particular time period).

Additionally, in some embodiments, an audio prompt is played at the beginning of operation 556, to guide the user regarding when to start speaking. The audio prompt may include a particular sound or a spoken phrase (e.g., "What can I do?" or "What would you like to listen to?"). As discussed extensively above, such audio prompts may in some cases be derived from stored voice artist recordings of particular voice artists. Thus, the audio prompt(s) may be customized for a listener, based on one or more characteristics of the listener and/or of a piece of music selected by the listener.

At operation 558, the captured audio signal is processed to determine an action for the media-playback device to perform. The audio signal may be processed to identify keywords that correspond to commands. Additionally, the audio signal may be processed to identify an intent associated with the captured audio signal. In some embodiments, the captured audio signal is processed locally by the media-playback device, while in other embodiments the media-playback device transmits the captured audio signal to another computing device (e.g., the media-delivery system 104) for processing. Combinations thereof are possible as well. In at least some embodiments, the action is a media-playback action that relates to the playback of media content items.

At operation 560, an audio confirmation corresponding to the action is played back. For example, if the action is determined to be a request to playback media content items from a playlist named Discovery Weekly, the audio confirmation may convey that the playlist will begin playing (e.g., "Starting playlist Discover Weekly"). Again, in some embodiments, this audio confirmation may be derived from stored voice artist recordings and may thus be customized for the listener and/or for the particular type of music to be played. At operation 562, the determined action is performed. For example, the media-playback device will begin playback of the requested playlist.

Figure 12:
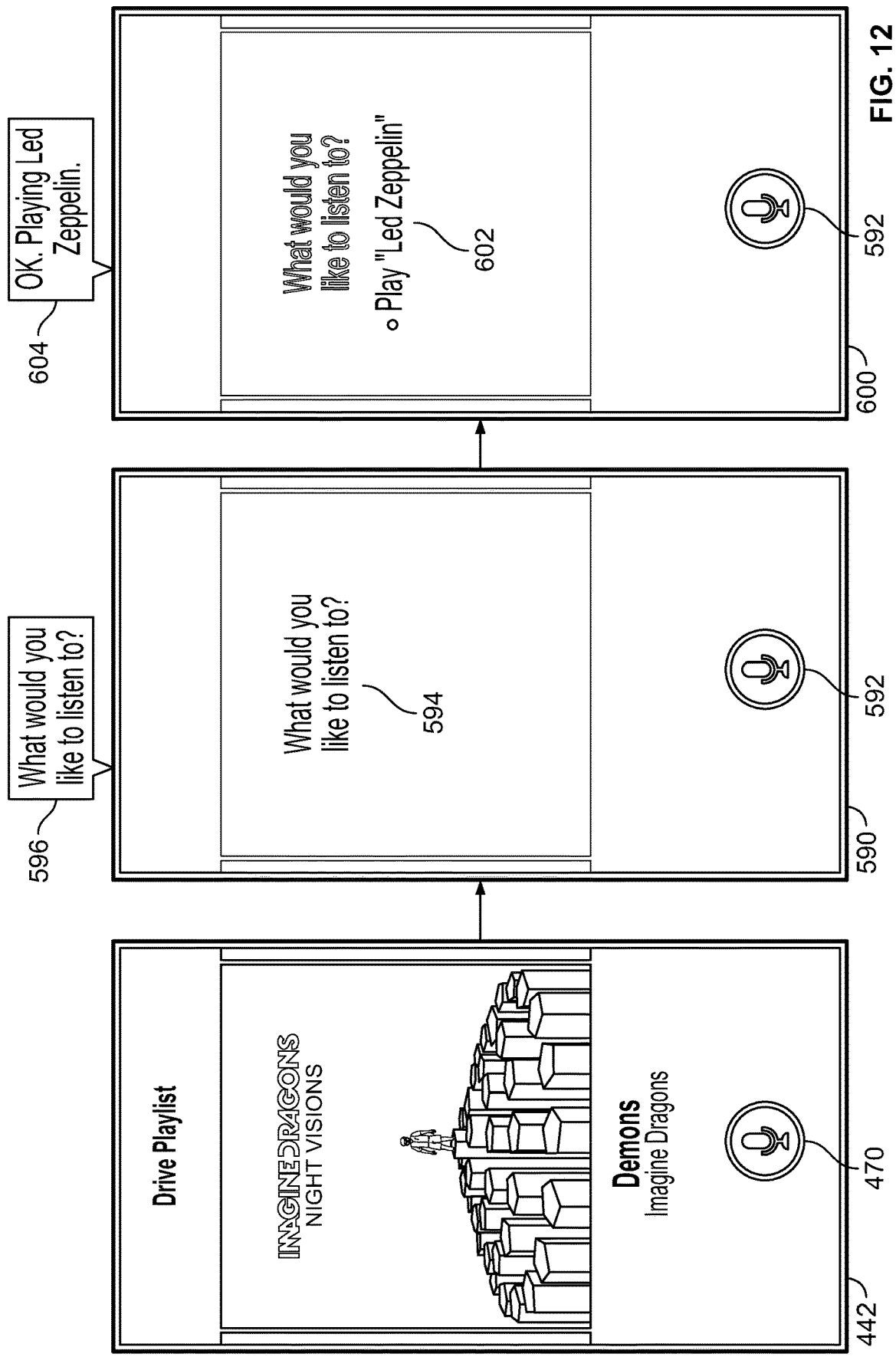
FIG. 12 includes schematic diagrams of series of example user interface screens generated and shown in travel mode during a voice command interaction with a user by some embodiments of the media-playback device of FIG. 3.

FIG. 12 includes schematic diagrams of series of example user interface screens generated and shown in travel mode during a voice command interaction with a user by some embodiments of the media-playback device 102. FIG. 12 includes the travel-mode user interface screen 442, a user interface screen 590 for receiving voice input, and a user interface screen 600 for responding to voice input.

The travel-mode user interface screen 442 has been described above. The travel-mode user interface screen 442 may be shown while a media content item is being played in a travel mode. If a voice command signal is received while the travel-mode user interface screen 442 is being displayed (e.g., due to actuation of voice command control 470), the user interface screen 590 will be displayed.

The user interface screen 590 includes a voice command mode indicator 592 and visual prompt 594. In this example, the voice command mode indicator 592 is shown in green to indicate that the media-playback device 102 is now listening for a voice command. The visual prompt 594 includes text that says "What would you like to listen to?" Other embodiments can include different or additional text.

When the user interface screen 590 is shown, an audio prompt 596 is generated. The audio prompt 596 may include spoken text such "What would like to listen to?" as is shown in the figure. Other text or sounds can be included in other embodiments too.

Once a voice command has been received from the user, the user interface screen 600 will be displayed. The user interface screen 600 includes the voice command mode indicator 592 and a visual prompt 602.

The visual prompt 602 includes text indicating the determined action/command. In this case, the text says "Play Led Zeppelin." Additionally, an audio prompt 604 is generated and played back by some embodiments when the command is determined. In this example, the audio prompt says "OK. Playing Led Zeppelin." For example, the audio prompt may be generated using text-to-speech/voice synthesis technology or by playing back a stored recording.

As described above, the voice command mode indicator 592 indicates that the microphone is continuing to record sounds. In this example, the microphone may continue recording after determining the command for a predetermined time period. This additional recording may be processed to receive a correction from the user (e.g., the user may say "No. Play Lead Belly"). Some embodiments do not continue to capture audio after a command is received.

Figure 13:
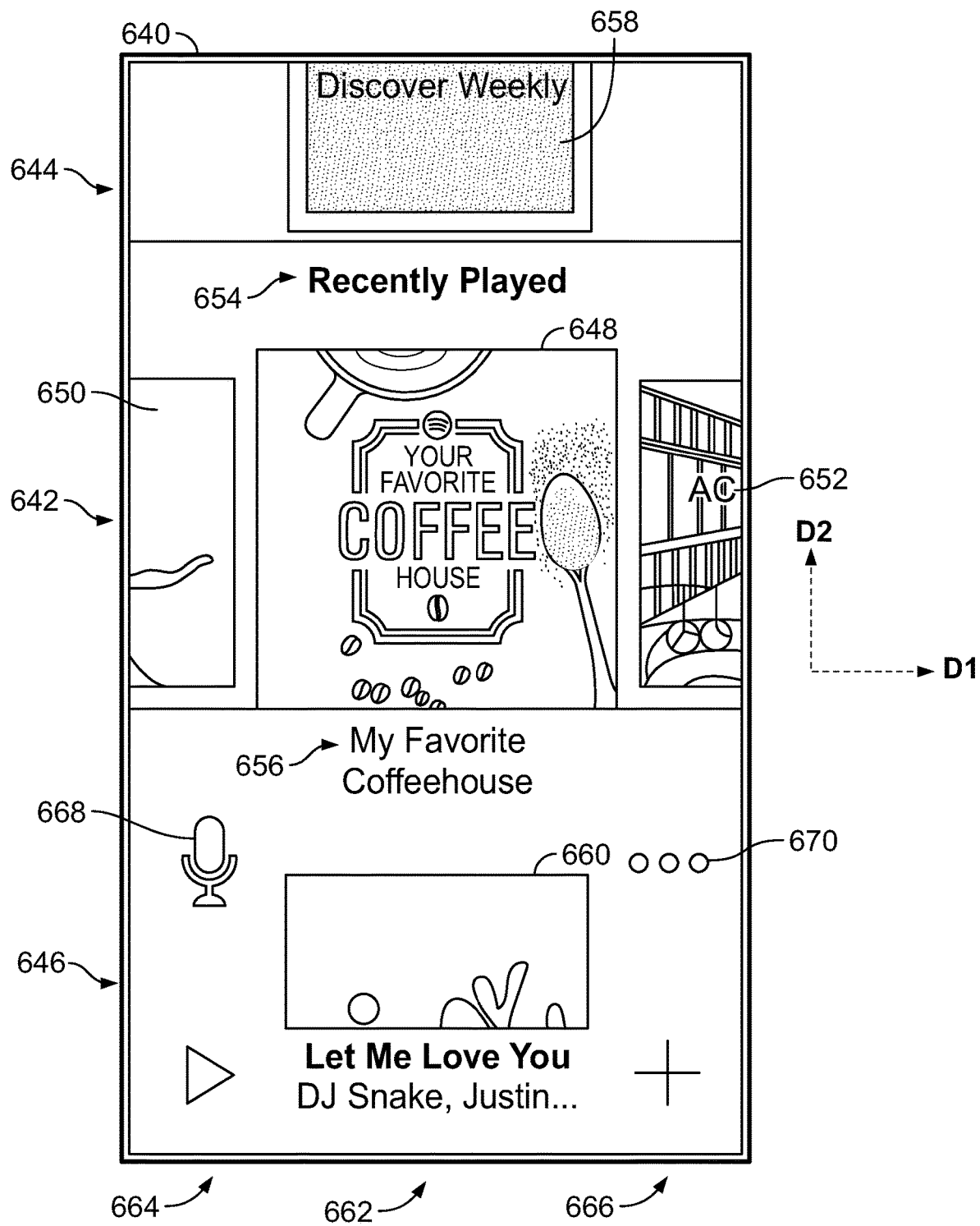
FIG. 13 is a schematic diagram of another embodiment of a user interface screen generated by some embodiments of the media-playback device of FIG. 3 when operating in a travel mode.

FIG. 13 is a schematic diagram of another embodiment of a user interface screen 640 generated by some embodiments of the media-playback device 102 when the media-playback device 102 is operating in a travel mode. The user interface screen 640 presents a plurality of cards on shelves that represent media content items that can be selected for playback. The cards are arranged along the shelves in a first direction D1 (e.g., horizontal in this figure) and the shelves are arranged in a second direction D2 (e.g., vertical in this figure) relative to each other. In some embodiments, the cards correspond to playlists of media content items and the shelves correspond to groups of playlists.

The media-playback device is configured to receive touch inputs to switch to a different card (e.g., playlist) or to select a card from a different shelf and, in doing so, change the focus of the user interface screen 640 to a different shelf. For example, a swipe touch input that is primarily directed in a horizontal direction will change to a different card in the current shelf and a swipe touch input that is primarily directed in a vertical direction will change to a different card in a different shelf.

In some embodiments, the primary direction of a received swipe touch input is determined by comparing the vertical change to the horizontal change between the initial contact point for the swipe touch input and the final contact point for the swipe touch input and selecting the direction with a greater magnitude of change. Alternatively, the primary direction of a received swipe touch may be based on determining the primary direction (as described above) of a portion of the swipe touch input (e.g., a first portion of a predetermined duration, a middle portion of a predetermined duration, a final portion of a predetermined duration or by excluding an initial or final portion of a predetermined duration the swipe touch input).

Some embodiments are configured to recognize a swipe touch input received at any location on the user interface screen 640 as a command to select a different card and/or shelf as described above. Other embodiments are configured to recognize only those swipe touch inputs that begin within a particular portion of the user interface screen 640 (e.g., on or near the currently playing card or on or near the current shelf) as a command to select a different card and/or shelf as described above.

In this example, the user interface screen 640 includes a currently selected shelf 642, an upper shelf 644, lower shelf 646. The currently selected shelf 642 displays graphical elements associated with a group of cards, including the graphical element 648 associated with a currently active card. The currently selected shelf 642 also displays a graphical element 650 and a graphical element 652 corresponding to other cards associated with the currently selected shelf 642. The graphical elements 650 and 652 are cropped to display only a portion of the images associated with the cards in some embodiments. As described above, various portions can be retained after cropping such as about 5%, about 10%, about 20%, about 25%, about 50%, or any other portion. The graphical elements 650 and 652 allow the user to preview the other options available on the currently selected shelf 642.

The user interface screen 640 also includes a textual descriptor 654 of the currently selected shelf 642. In this case, the textual descriptor 654 includes the textual "Recently Played," indicating that the cards in the currently selected shelf 642 are selected based on the user's recent listening history. The user interface screen 640 also includes a textual descriptor 656 of the currently playing card. In this example, the textual descriptor 656 includes the text "My Favorite Coffeehouse."

In this example, the upper shelf 644 includes a graphical element 658 corresponding to a card available on the upper shelf 644. Similarly, the lower shelf 646 includes a graphical element 660 corresponding to a card available on the lower shelf 646. In other embodiments, graphical elements for multiple cards available on the upper shelf 644 and the lower shelf 646 are included. The graphical element 658 and the graphical element 660 allow users to preview the cards available on the upper shelf 644 and the lower shelf 646 respectively. The graphical elements 658 and 660 can be cropped to display only portions of the image corresponding to the associated cards. For example, in this figure, the graphical elements 658 and 660 include images that are cropped horizontally to preserve a lower portion or upper portion of the corresponding images, respectively. Various portions of the graphical elements 658 and 660 can be retained after cropping such as about 5%, about 10%, about 20%, about 25%, about 50%, or any other portion.

The user interface screen 640 also includes various additional user interface elements. For example, the user interface screen 640 includes a textual description 662 of the currently playing media content item, a play-pause control 664, a like control 666, a voice command control 668, and an additional options control 670. The play-pause control 664 toggles playback of the currently playing media content item when actuated. The control 666 marks the currently playing media content item as a favorite (e.g., by setting a field in a database, adding the media content item to a playlist, etc.). The voice command control 668 activates a voice command mode and may be similar to the previously described voice command control 470. The additional options control 670 presents additional options when actuated. The additional options can, for example, relate to the currently playing media content item.

Additionally, in some embodiments a tap touch input is recognized as a skip forward command and a double tap touch input is recognized as skip backwards (or previous) command. The media-playback device 102 may be configured to recognize these skip forward/backward commands when the corresponding tap/double-tap inputs are received anywhere on the user interface screen 640. In these embodiments, actuating the other user interface elements may, for example, require a long tap. Alternatively, the media-playback device 102 may be configured to recognize these skip forward/backward commands when the corresponding tap/double-tap inputs are received anywhere on the user interface screen 640 such as on or near the graphical element 648 or on or near the currently selected shelf 642.

Figure 14:
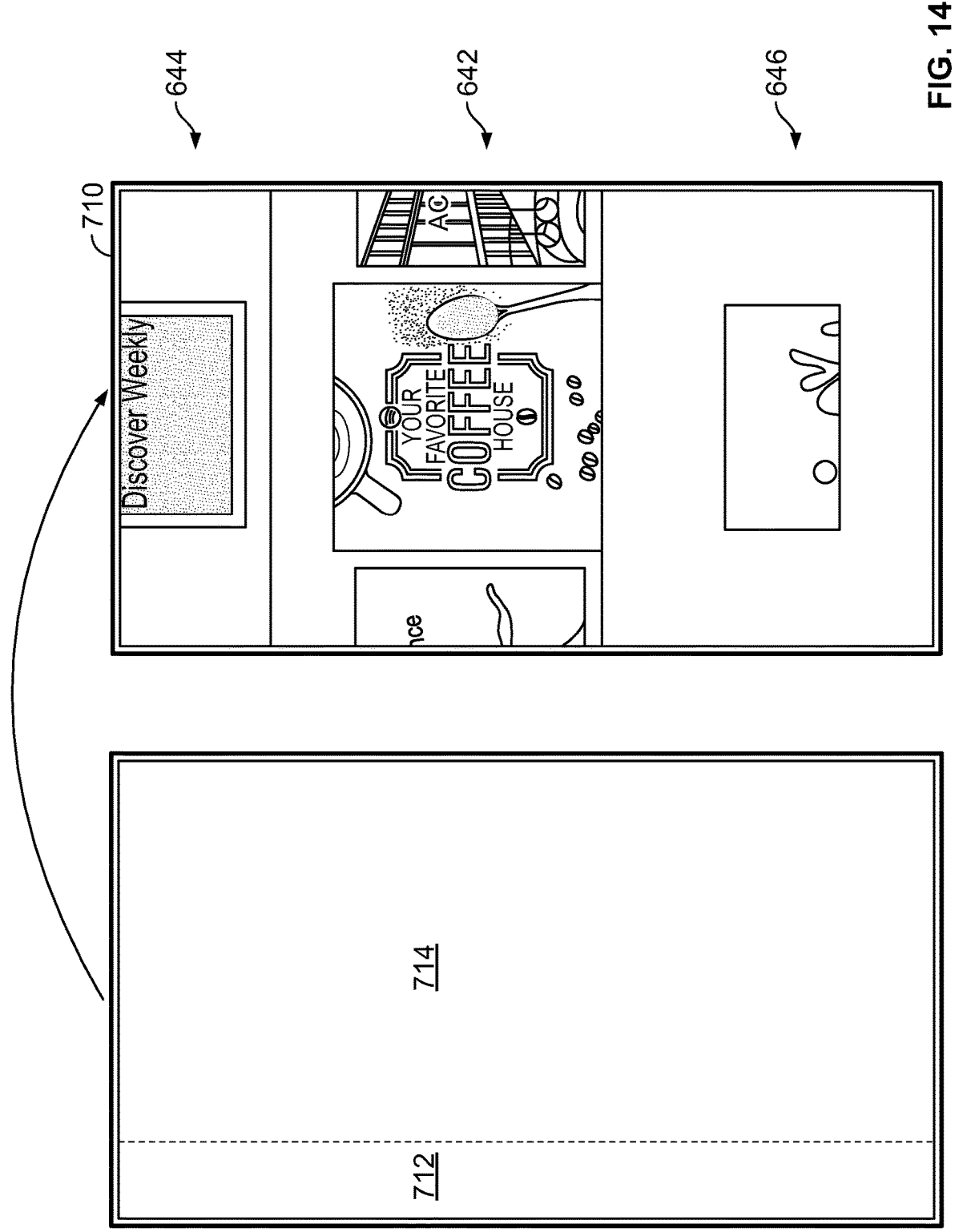
FIG. 14 is a schematic diagram of another embodiment of a user interface screen generated by some embodiments of the media-playback device of FIG. 3 when operating in a travel mode.

FIG. 14 is a schematic diagram of another embodiment of a user interface screen 710 generated by some embodiments of the media-playback device 102 when the media-playback device 102 is operating in a travel mode. Similar to the user interface screen 640, the user interface screen 710 presents a plurality of cards on shelves that represent media content items that can be selected for playback. Also shown are touch targets 712 and 714. The touch targets overlay the user interface screen 710 but are shown next to the user interface screen 710 for clarity. In other words, the touch targets 712 and 714 represent how the user interface screen 710 is divided into regions for interpreting touch inputs.

In this example, the media-playback device 102 is configured to recognize a tap touch input received in the touch targets 712 as a skip backward (previous) command, and a tap touch input received in the touch targets 714 as a skip forward command. In this example, the user interface screen 750 is divided vertically between the touch targets 712 and touch targets 714. The touch targets 712 is disposed over a left-most portion of the screen and the touch targets 714 is disposed over the remainder of the screen. In this example, the touch targets 714 is larger than the touch targets 712 to allow users to more easily perform a skip forward action. In some embodiments, other divisions between the touch targets 712 and the touch targets 714 are used. For example, the division can be at 10%, 20%, 25%, 33%, 40%, 50%, or another percentage of the screen.

Figure 15:
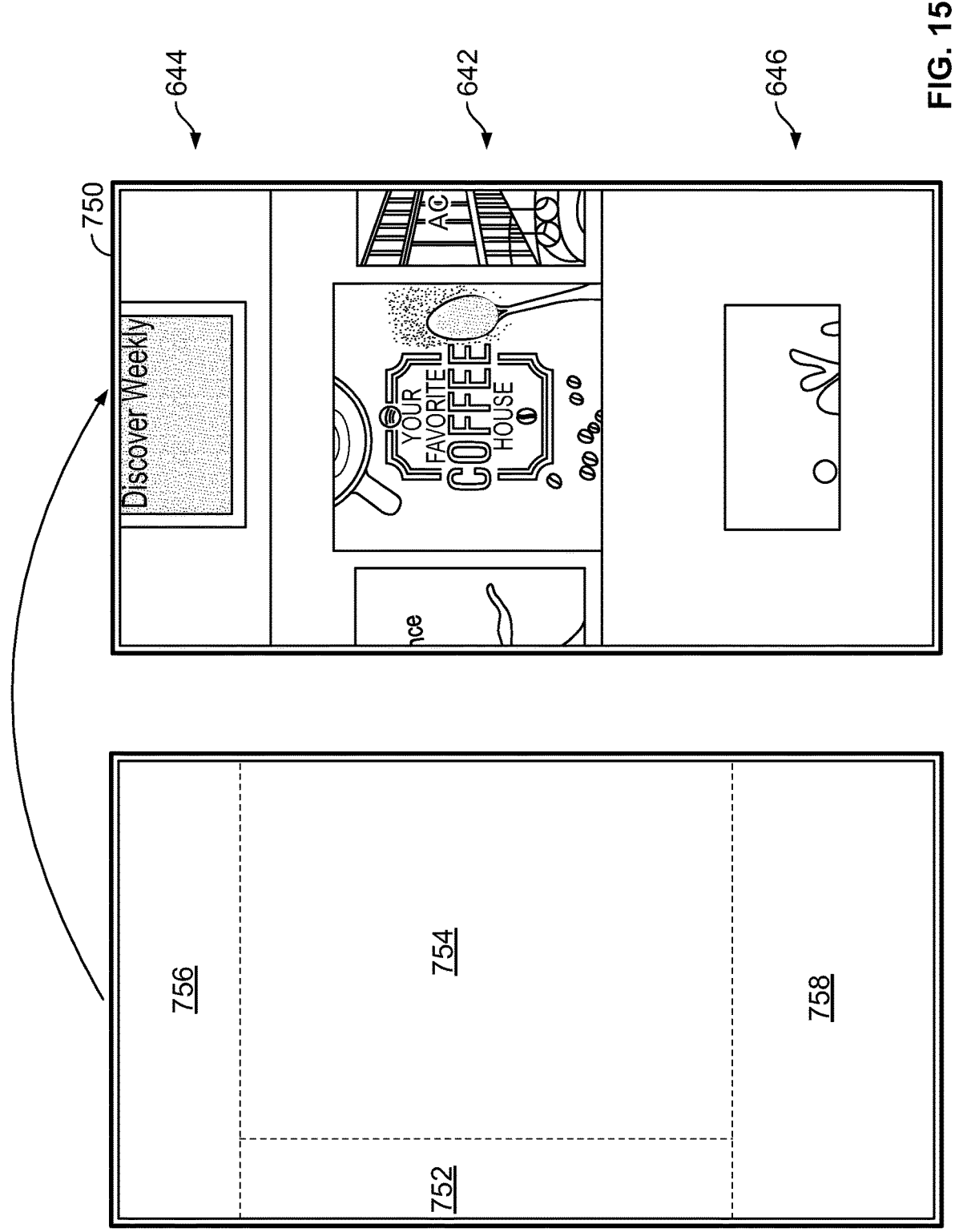
FIG. 15 is a schematic diagram of another embodiment of a user interface screen generated by some embodiments of the media-playback device of FIG. 3 when the operating in a travel mode.

FIG. 15 is a schematic diagram of another embodiment of a user interface screen 750 generated by some embodiments of the media-playback device 102 when the media-playback device 102 is operating in a travel mode. The user interface screen 750 is similar to the media-playback engine 170 discussed above with respect to FIG. 12. However, in this example, the user interface screen 750 is divided into a touch target 752, a touch target 754, a touch target 756, and a touch target 758. The touch targets 752 and 754 may operate similarly to the previously described touch targets 712 and 714. However, the touch target 752 and 754 do not extend from the top to the bottom of the user interface screen 750. Instead, the touch targets 756 and 758 are disposed as horizontal bands across the top and bottom of the user interface screen 750 respectively. Various embodiments are configured to provide various functionality when tap touch inputs are detected within the touch target 756 and the touch target 758 (e.g., switching shelves, actuate a different user interface element such as those shown with respect to user interface screen 640 in FIG. 13).

Similar to the user interface screen 640, the user interface screen 710 presents a plurality of cards on shelves that represent media content items that can be selected for playback. Also shown are touch targets 712 and 714. The touch targets overlay the user interface screen 710 but are shown next to the user interface screen 710 for clarity. In other words, the touch targets 712 and 714 represent how the user interface screen 710 is divided into regions for interpreting touch inputs.

Figure 16:
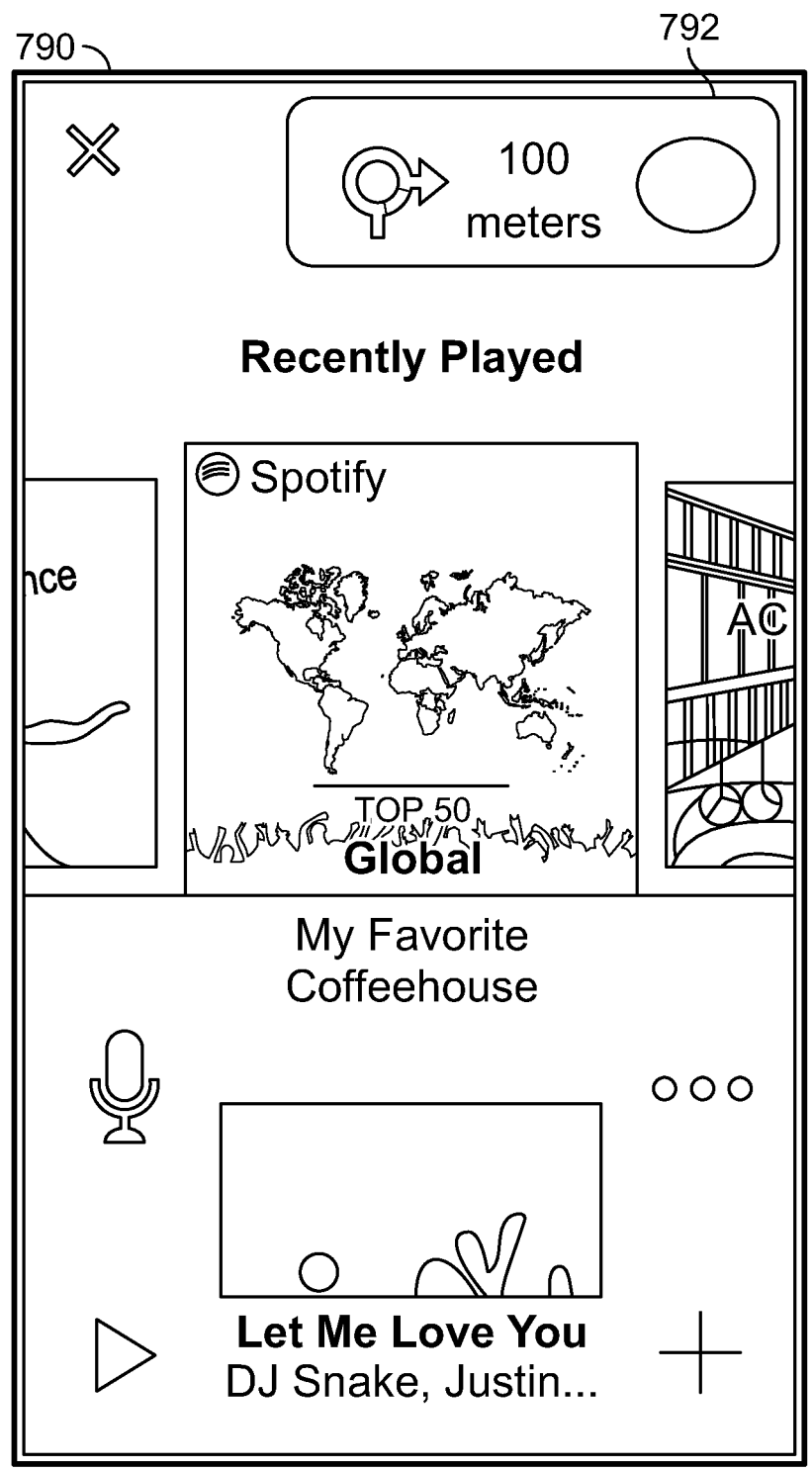
FIG. 16 is a schematic diagram of another embodiment of a user interface screen generated by some embodiments of the media-playback device of FIG. 3 when operating in a travel mode.
Figure 17:
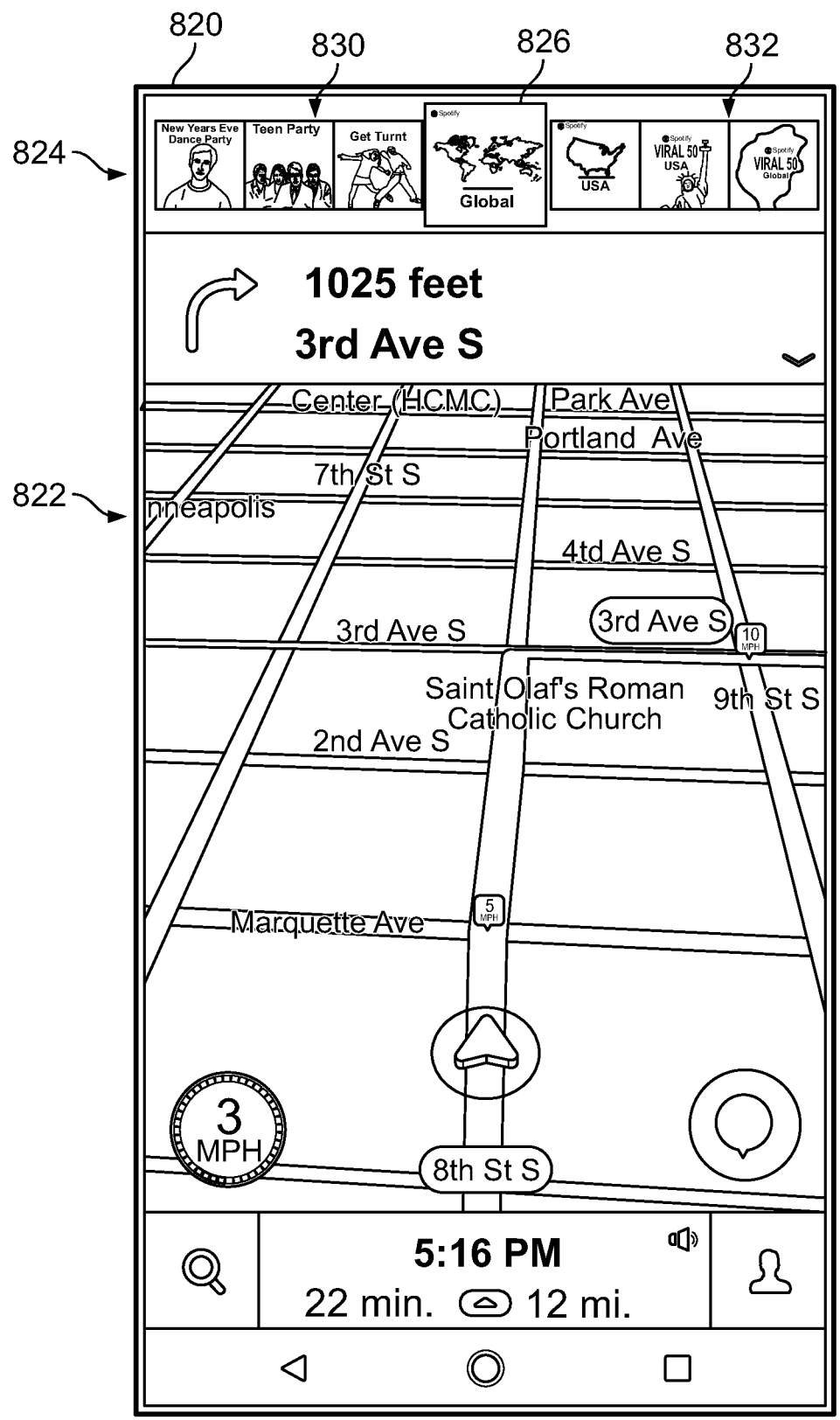
FIG. 17 is a schematic diagram of another embodiment of a user interface screen generated by some embodiments of the media-playback device of FIG. 3 when operating in a travel mode.

FIG. 16 is a schematic diagram of another embodiment of a user interface screen 790 generated by some embodiments of the media-playback device 102 when the media-playback device 102 is operating in a travel mode. The user interface screen 790 is similar to the user interface screen 640 shown in FIG. 13 except that the user interface screen 790 also includes information pane 792. In this example, the information pane 792 includes navigation information provided by a navigation application. Here, the navigation information comprises next turn information. In some embodiments, the media-playback device 102 is configured to switch to a different application in response to receiving a touch input within the information pane 792. For example, the media-playback device 102 may switch to the navigation application providing the next turn information (e.g., as shown in FIG. 17). Additionally, some embodiments include a user-actuatable interface element to expand the information pane 792 to provide additional information overlaid on the user interface screen 790. The information shown in the information pane 792 is generated by a third-party application in some embodiments. Although the example shown in this figure relates to a navigation information and specifically next turn information. Other types of information can be shown too such as traffic information, weather information, communication information, etc.

FIG. 17 is a schematic diagram of another embodiment of a user interface screen 820 generated by some embodiments of the media-playback device 102 when the media-playback device 102 is operating in a travel mode. The user interface screen 820 allows for control of media content playback while providing content from another application. In this embodiments, the user interface screen 820 includes an application content panel 822 and a media content selection panel 824.

In some embodiments, the media-playback engine 170 receives the content displayed in the application content panel 822 from another application running on the media-playback device 102. Alternatively, the media-playback engine 170 transmits the content displayed within the media content selection panel 824 to another application running on the media-playback device 102 for display within the application. In this example, the application content panel 822 includes content related to navigating.

The media content selection panel 824 includes controls for selecting media content items for playback. In this example, the media content selection panel 824 includes a shelf that includes a currently playing card 826, additional cards 830 that can be accessed and selected with a swipe left touch input, and additional cards 832 that can be accessed and selected with a swipe right touch input. In some embodiments, a tap touch input within the media content selection panel 824 is recognized as a skip forward command and a double-tap touch input is recognized as a skip backward (previous) command.

In some embodiments, base (or normal mode) user interfaces are provided using a declarative language. The base user interfaces may be stored locally on the media-playback device 102 or may be provided by the media-delivery system 104. Some embodiments perform a method of simplifying these base user interfaces to generate travel mode user interfaces for use during travel. In this manner, a single base user interface can be defined that can be programmatically converted to a travel mode user interface.

An example method for programmatically converting a base user interface can include the step of identifying and removing user interface elements that are smaller than a predetermined threshold. The method can also include removing less necessary controls, which may be identified based on a predefined set of control types (e.g., controls relating to curating (generating or editing) playlists may be in this set for removal in travel mode). The based user interface may also include tags that indicate whether the elements are necessary (e.g., an optional tag). The method can also include the step of generating touch targets for the remaining elements that are larger than in the base user interface. The method may also expand the rendering of the remaining element to match the expanded touch targets. Additionally, the method can include the step of generating a default action for touches that are outside of the defined touch targets (e.g., the default action may be skip for a single tap). The base user interface definition may also include information about an appropriate default action.

Here is an example declarative language definition of a portion of a base user interface:

```
<area name="background">
  <button name="button1" size="2">
  <button name="button2" size="5">
  <button name="button3" size="2">
</area>
```

Here is another example declarative language definition of a portion of a base user interface that include tags for use in rendering a travel mode user interface:

```
<area name="background">
  <button name="button1" size="2" importance="low">
  <button name="button2" size="5" importance="high" optional-strike="background">
  <button name="button3" size="2" importance="low">
</area>
```

In some embodiments, when rendering this example user interface in normal mode, the importance and optional-strike tags are ignored, but when rendered in travel mode the tags are used. For example, the elements marked with low importance attributes are not rendered in the travel mode interface, the size of the remaining elements is increased (e.g., from 5 to 7), and an element is selected as the default button for background touches based on the optional-strike attribute.

As noted previously, although many of the examples provided above are described with respect to travelling in a vehicle, other embodiments relate to other forms of travel or even other types of activities in which a user should not be distracted.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A media delivery system comprising:
a processing device; and
a memory device coupled to the processing device and storing instructions that, when executed by the processing device, cause the media delivery system to:
generate a plurality of sets of voice feedback recordings, wherein each of the plurality of sets of voice feedback recordings is generated from at least one initial voice feedback recording using a machine learning model;
store the plurality of sets of voice feedback recordings, wherein each set corresponds to a different voice;
receive, from a media playback device located in a vehicle, a command received as input from a user of the media playback device, the command associated with playback of a media content item;
in response to receiving the command:
determine an action to be performed in response to the command;
pair a set of voice feedback recordings, from the plurality of sets of voice feedback recordings generated from the at least one initial voice feedback recording using the machine learning model, with the media content item based on a characteristic of the media content item;
select, from the set of voice feedback recordings paired with the media content item, a voice feedback recording that corresponds to the determined action; and
provide an instruction causing playback of the voice feedback recording to the media playback device in the vehicle.

2. The media delivery system of claim 1, wherein each respective set of voice feedback recordings has a different tempo, different words, different pitches and/or different speaking styles.

3. The media delivery system of claim 1, wherein the command associated with playback of the media content item includes a selection of at least one of the group consisting of: a song, an album, an artist, a style, a playlist, a shelf comprised of a plurality of cards each representing a media content item, and a card representing a media content item.

4. The media delivery system of claim 1, wherein the characteristic of the media content item includes at least one of the group consisting of: a track identifier, a title of a song, a title of an album, a style, a tempo, a pitch, an artist, and a recording year.

5. The media delivery system of claim 1, wherein the media delivery system is caused to further pair the set of voice feedback recordings with the media content item based on a characteristic of the user, the characteristic of the user including at least one of the group consisting of: a geographical location of the user and one or more predefined identifying characteristics provided by the user to the media delivery system.

6. The media delivery system of claim 1, wherein the media delivery system is further caused to:
derive, from the plurality of sets of voice feedback recordings, an audio prompt; and
provide an instruction to play back the audio prompt to the media playback device, wherein the command received as input from the user at the media playback device is received in response to the playback of the audio prompt, and the voice feedback recording is provided as an audio confirmation.

7. The media delivery system of claim 1, wherein the media playback device located in the vehicle is one of:
a media playback device integrated with a vehicle head unit of a vehicle media playback system of the vehicle;
a media playback device that is separate from and communicatively coupled to the vehicle media playback system of the vehicle; or
a media playback device that is communicatively coupled to an external speaker assembly that is positioned in the vehicle and is separate from the vehicle media playback system of the vehicle.

8. At least one non-transitory computer readable storage device storing instructions that, when executed by at least one processing device, cause the at least one processing device to:
generate a plurality of sets of voice feedback recordings, wherein each of the plurality of sets of voice feedback recordings is generated from at least one initial voice feedback recording using a machine learning model;
store the plurality of sets of voice feedback recordings, wherein each set corresponds to a different voice;
receive a command input by a user of a media playback device located in a vehicle, the command associated with playback of a media content item;
in response to receiving the command:
determine an action to be performed in response to the command;
pair a set of voice feedback recordings, from the plurality of sets of voice feedback recordings generated from the at least one initial voice feedback recording using the machine learning model, with the media content item based on a characteristic of the media content item;
select, from the set of voice feedback recordings paired with the media content item, a voice feedback recording that corresponds to the determined action; and
provide an instruction causing playback of the voice feedback recording to the media playback device in the vehicle.

9. A media playback device for media content playback in a vehicle, comprising:
a processing device; and
a memory device coupled to the processing device and storing instructions that when executed by the processing device, cause the media playback device to:
generate a plurality of sets of voice feedback recordings, wherein each of the plurality of sets of voice feedback recordings is generated from at least one initial voice feedback recording using a machine learning model;
receive, as input from a user of the media playback device, a command associated with playback of a media content item;
in response to receiving the command:
determine an action to be performed in response to the command;
pair a set of voice feedback recordings with the media content item based on a characteristic of the media content item, wherein a media server stores a plurality of sets of voice feedback recordings of different voices generated from the at least one initial voice feedback recording using the machine learning model, including the set of voice feedback recordings paired with the media content item;
select, from the set of voice feedback recordings paired with the media content item, a voice feedback recording that corresponds to the determined action;
receive, from the media server, the voice feedback recording; and
play the voice feedback recording in the vehicle.

10. The media playback device of claim 9, wherein the media playback device is integrated with a vehicle head unit of a vehicle media playback system of the vehicle.

11. The media playback device of claim 10, wherein the vehicle media playback system further includes a speaker assembly, and to play the voice feedback recording in the vehicle, the media playback device integrated with the vehicle head unit provides a signal to the speaker assembly to cause the voice feedback recording to be played as media output of the speaker assembly in the vehicle.

12. The media playback device of claim 9, wherein the media playback device is a separate device that is communicatively coupled to a vehicle media playback system of the vehicle, the vehicle media playback system including:
a vehicle head unit that receives a first signal from the media playback device to play the voice feedback recording and generates media output based on the first signal; and
a speaker assembly that receives a second signal from the vehicle head unit and causes the voice feedback recording to be played as the media output of the speaker assembly in the vehicle.

13. The media playback device of claim 9, wherein the media playback device is communicatively coupled to an external speaker assembly that is positioned in the vehicle and is separate from a vehicle media playback system of the vehicle, and to play the voice feedback recording in the vehicle, the media playback device provides a signal to the external speaker assembly causing the voice feedback recording to be played as media output of the external speaker assembly in the vehicle.

14. The media playback device of claim 9, wherein the media playback device is further caused to play the media content item in the vehicle, and the voice feedback recording is played at least partially before the media content item is played.

15. The media playback device of claim 9, wherein the media playback device is further caused to play the media content item in the vehicle, and a portion of the voice feedback recording is played at a same time that a beginning portion of the media content item is played.

16. The media playback device of claim 15, wherein at least the portion of the voice feedback recording is played on-beat when the beginning portion of the media content item is played.

17. The media playback device of claim 9, wherein the media playback device is further caused to play the media content item in the vehicle, and the voice feedback recording is played at least partially after the media content item is played.

18. The media playback device of claim 9, wherein when the command is received during travel, the media playback device is caused to receive the command as a voice command in response to actuation by the user of a voice command control provided for display in a travel-mode user interface of the media playback device.

19. The media playback device of claim 18, wherein the media playback device is further caused to display the travel-mode user interface in response to at least one of:
  detecting that the media playback device is communicatively coupled to a vehicle media playback system of the vehicle; and
  detecting, using the media playback device, a movement of the media playback device that exceeds a predetermined threshold.

\* \* \* \* \*